United States Patent
Elshafie et al.

(10) Patent No.: US 12,556,241 B2
(45) Date of Patent: Feb. 17, 2026

(54) PRECODING FOR SIDELINK COMMUNICATIONS

(71) Applicant: QUALCOMM Incorporated, San Diego, CA (US)

(72) Inventors: Ahmed Elshafie, San Diego, CA (US); Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 17/486,764

(22) Filed: Sep. 27, 2021

(65) Prior Publication Data

US 2023/0101382 A1   Mar. 30, 2023

(51) Int. Cl.
*H04B 7/0456* (2017.01)
*H04L 5/00* (2006.01)
*H04W 72/20* (2023.01)

(52) U.S. Cl.
CPC ......... *H04B 7/0456* (2013.01); *H04L 5/0048* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 9,787,379 B2 * | 10/2017 | Onggosanusi | ........ | H04W 48/00 |
| 10,020,860 B2 * | 7/2018 | Onggosanusi | ....... | H04B 7/0479 |
| 11,818,568 B2 * | 11/2023 | Ashraf | ................. | H04W 76/14 |
| 2016/0142115 A1 * | 5/2016 | Onggosanusi | ........ | H04W 48/00 |
| | | | | 370/252 |
| 2016/0156397 A1 * | 6/2016 | Onggosanusi | ....... | H04B 7/0421 |
| | | | | 370/252 |
| 2016/0156401 A1 * | 6/2016 | Onggosanusi | ....... | H04B 7/0482 |
| | | | | 370/329 |
| 2020/0106491 A1 * | 4/2020 | Wu | ...................... | H04B 7/0417 |
| 2020/0195317 A1 * | 6/2020 | Yasukawa | ............ | H04B 7/0456 |
| 2020/0336187 A1 * | 10/2020 | Hu | ....................... | H04B 7/0452 |
| 2021/0045103 A1 * | 2/2021 | Kim | ...................... | H04W 4/70 |
| 2021/0176094 A1 * | 6/2021 | Kang | ................... | H04L 5/0094 |
| 2021/0298030 A1 * | 9/2021 | Li | ......................... | H04W 72/23 |

(Continued)

OTHER PUBLICATIONS

International Search Report and Written Opinion—PCT/US2022/075685—ISA/EPO—Dec. 14, 2022.

*Primary Examiner* — Chirag G Shah
*Assistant Examiner* — Suk Jin Kang
(74) *Attorney, Agent, or Firm* — Holland & Hart LLP

(57) ABSTRACT

Methods, systems, and devices for wireless communications are described. Generally, the described techniques provide for a first user equipment (UE) transmitting, to a second UE, a sidelink message that includes an unprecoded reference signal. The second UE may measure the unprecoded reference signal and select a precoding matrix. The second UE may transmit a precoding matrix indication (PMI) to the first UE. The first UE may then transmit at least one sidelink message that is at least partially precoded in accordance with the PMI. In some cases, the first UE and the second UE may communicate according to a unprecoded transmission and precoded transmission pattern, where a new PMI is selected, using an unprecoded transmission, after a predefined number of precoded transmissions.

21 Claims, 11 Drawing Sheets

(56) References Cited

U.S. PATENT DOCUMENTS

| | | | |
|---|---|---|---|
| 2021/0314962 A1* | 10/2021 | Ashraf | H04B 17/309 |
| 2021/0321385 A1* | 10/2021 | Lee | H04B 17/24 |
| 2021/0329603 A1* | 10/2021 | Zhao | H04L 5/0051 |
| 2021/0367717 A1* | 11/2021 | Khoryaev | H04L 5/0057 |
| 2021/0377931 A1* | 12/2021 | Zhang | H04L 5/0048 |
| 2021/0385845 A1* | 12/2021 | Zhao | H04L 1/1664 |
| 2022/0022085 A1* | 1/2022 | Ji | H04W 76/19 |
| 2022/0053513 A1* | 2/2022 | Ryu | H04W 72/1263 |
| 2022/0077984 A1* | 3/2022 | Lee | H04L 5/0094 |
| 2022/0085923 A1* | 3/2022 | Ye | H04L 1/1825 |
| 2022/0085951 A1* | 3/2022 | Lee | H04L 1/18 |
| 2022/0095308 A1* | 3/2022 | Ashraf | H04B 7/063 |
| 2022/0110105 A1* | 4/2022 | Belleschi | H04W 76/14 |
| 2022/0132516 A1* | 4/2022 | Hwang | H04L 5/0057 |
| 2022/0159674 A1* | 5/2022 | Deng | H04W 72/566 |
| 2022/0182866 A1* | 6/2022 | Lee | H04W 24/10 |
| 2022/0190891 A1* | 6/2022 | Moloudi | H04L 1/0038 |
| 2022/0217680 A1* | 7/2022 | Li | H04W 4/40 |
| 2022/0225342 A1* | 7/2022 | Zhao | H04W 4/40 |
| 2022/0240237 A1* | 7/2022 | Park | H04W 72/20 |
| 2022/0295297 A1* | 9/2022 | Li | H04W 16/28 |
| 2022/0295419 A1* | 9/2022 | Guo | H04L 1/1812 |
| 2022/0329301 A1* | 10/2022 | Shin | H04L 1/0003 |
| 2022/0338301 A1* | 10/2022 | Park | H04W 4/40 |
| 2022/0360403 A1* | 11/2022 | Salim | H04L 5/0051 |
| 2022/0369417 A1* | 11/2022 | Park | H04W 28/0268 |
| 2022/0376761 A1* | 11/2022 | Lee | H04L 5/005 |
| 2022/0394722 A1* | 12/2022 | Hwang | H04W 72/542 |
| 2023/0015555 A1* | 1/2023 | Hwang | H04W 52/242 |
| 2023/0050238 A1* | 2/2023 | Ganesan | H04W 76/14 |
| 2023/0089655 A1* | 3/2023 | Yeo | H04L 5/0092 370/329 |
| 2023/0095061 A1* | 3/2023 | Son | H04W 24/10 370/252 |
| 2023/0103523 A1* | 4/2023 | Lee | H04L 5/005 370/329 |
| 2023/0179372 A1* | 6/2023 | Liu | H04L 5/0051 370/330 |
| 2023/0199800 A1* | 6/2023 | Liu | H04L 5/0051 370/329 |

* cited by examiner

PRECODING FOR SIDELINK COMMUNICATIONS

TECHNICAL FIELD

The following relates to wireless communications, including precoding for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In wireless communications systems, communications between a user equipment (UE) and a base station may be precoded, which may support beam alignment between both devices and reduce interference with other communications. To determine a precoding matrix for precoding downlink communications, a base station may transmit a reference signal to a UE, and the UE may measure the reference signal and transmit an uplink precoding matrix indication (PMI) to the base station. The base station may transmit subsequent communications to the UE that are precoding using the precoding matrix indicated by the UE.

SUMMARY

The described techniques relate to improved methods, systems, devices, and apparatuses that support precoding for sidelink communications. Generally, the described techniques provide for a first user equipment (UE) transmitting, to a second UE, a sidelink message that includes an unprecoded reference signal, such as a demodulation reference signal (DMRS) or a channel state information (CSI) reference signal (RS). The second UE may measure the unprecoded reference signal and select a precoding matrix. The second UE may transmit a precoding matrix indication (PMI) to the first UE. The first UE may then transmit at least one sidelink message that is at least partially precoded in accordance with the PMI. In some cases, the first UE and the second UE may communicate according to a unprecoded transmission and precoded transmission pattern, where a new PMI is selected, using an unprecoded transmission, after a predefined number of precoded transmissions.

A method for wireless communications at a first user equipment (UE) is described. The method may include transmitting, to a second UE via a sidelink connection, a first sidelink message that includes an unprecoded reference signal, receiving, from the second UE via the sidelink connection, an indication of a precoding matrix based on the unprecoded reference signal included in the first sidelink message, and transmitting, to the second UE, at least one second sidelink message that is at least partially precoded in accordance with the indication of the precoding matrix.

An apparatus for wireless communications at a first UE is described. The apparatus may include at least one processor, memory coupled with the at least one processor, and instructions stored in the memory. The instructions may be executable by the at least one processor to cause the apparatus to transmit, to a second UE via a sidelink connection, a first sidelink message that includes an unprecoded reference signal, receive, from the second UE via the sidelink connection, an indication of a precoding matrix based on the unprecoded reference signal included in the first sidelink message, and transmit, to the second UE, at least one second sidelink message that is at least partially precoded in accordance with the indication of the precoding matrix.

Another apparatus for wireless communications at a first UE is described. The apparatus may include means for transmitting, to a second UE via a sidelink connection, a first sidelink message that includes an unprecoded reference signal, means for receiving, from the second UE via the sidelink connection, an indication of a precoding matrix based on the unprecoded reference signal included in the first sidelink message, and means for transmitting, to the second UE, at least one second sidelink message that is at least partially precoded in accordance with the indication of the precoding matrix.

A non-transitory computer-readable medium storing code for wireless communications at a first UE is described. The code may include instructions executable by at least one processor to transmit, to a second UE via a sidelink connection, a first sidelink message that includes an unprecoded reference signal, receive, from the second UE via the sidelink connection, an indication of a precoding matrix based on the unprecoded reference signal included in the first sidelink message, and transmit, to the second UE, at least one second sidelink message that is at least partially precoded in accordance with the indication of the precoding matrix.

Some examples of the method, apparatuses, and non-transitory computer-readable medium described herein may further include operations, features, means, or instructions for transmitting, to the second UE, a sidelink control message that indicates a precoding configuration that the first UE may be to use for the sidelink connection, where the first sidelink message and the at least one second sidelink message may be transmitted according to the precoding configuration.

In some examples of the method, apparatuses, and non-transitory computer-readable medium described herein, transmitting the sidelink control message may include operations, features, means, or instructions for transmitting an indication of a periodicity that corresponds to the precoding configuration, where the first sidelink message and the at least one second sidelink message may be transmitted according to the periodicity and subsequent first sidelink messages include the unprecoded reference signal used for precoding matrix determination to be applied to precoding for subsequent second sidelink messages.

In some examples of the method, apparatuses, and non-transitory computer-readable medium described herein, the precoding configuration further indicates an expiration time and the first UE may be to transmit an unprecoded sidelink message upon satisfaction of the expiration time.

In some examples of the method, apparatuses, and non-transitory computer-readable medium described herein, the precoding configuration indicates the expiration time based on the first UE and the second UE operating according to a sidelink mode 2 procedure.

In some examples of the method, apparatuses, and non-transitory computer-readable medium described herein, transmitting the sidelink control message may include operations, features, means, or instructions for transmitting an indication of a bitmap that corresponds to a precoding pattern across a set of transmission time intervals to be used for the sidelink connection, where a first value of the bitmap corresponds to a sidelink message that includes the unprecoded reference signal and a second value of the bitmap corresponds to a sidelink message that may be at least partially precoded, where the first sidelink message and the at least one second sidelink message may be transmitted in accordance with the bitmap.

In some examples of the method, apparatuses, and non-transitory computer-readable medium described herein, transmitting the sidelink control message may include operations, features, means, or instructions for transmitting an indication that sidelink control information may be to be unprecoded in the at least one second sidelink message, where the at least one second sidelink message may be transmitted with the sidelink control information being unprecoded and information of physical sidelink shared channel resources of the at least one second sidelink message being precoded.

In some examples of the method, apparatuses, and non-transitory computer-readable medium described herein, the sidelink control information that may be to be unprecoded may be type 1 sidelink control information.

In some examples of the method, apparatuses, and non-transitory computer-readable medium described herein, the precoding configuration indicates that the sidelink control information may be to be unprecoded based on the sidelink control information includes a resource reservation for one or more subsequent transmissions.

In some examples of the method, apparatuses, and non-transitory computer-readable medium described herein, the precoding configuration indicates that the sidelink control information may be to be unprecoded based on the first UE operating according to a mode 1 sidelink procedure.

In some examples of the method, apparatuses, and non-transitory computer-readable medium described herein, transmitting the sidelink control message may include operations, features, means, or instructions for transmitting an indication that sidelink control information may be to be precoded in the at least one second sidelink message, where the at least one second sidelink message may be transmitted with the sidelink control information being precoded and information of physical sidelink shared channel resources of the at least one second sidelink message being precoded.

In some examples of the method, apparatuses, and non-transitory computer-readable medium described herein, the sidelink control information that may be to be precoded may be type 1 sidelink control information.

In some examples of the method, apparatuses, and non-transitory computer-readable medium described herein, transmitting the sidelink control message may include operations, features, means, or instructions for transmitting an indication that the second UE may be to report the indication of the precoding matrix, that the at least one second sidelink message may be to be at least partially precoded, or both.

In some examples of the method, apparatuses, and non-transitory computer-readable medium described herein, transmitting the sidelink control message may include operations, features, means, or instructions for transmitting a type 1 sidelink control information message, a type 2 sidelink control information message, or a PC5 message.

In some examples of the method, apparatuses, and non-transitory computer-readable medium described herein, transmitting the sidelink control message may include operations, features, means, or instructions for transmitting the sidelink control message that indicates the precoding configuration when a number of ports to be used for sidelink transmissions on the sidelink connection may be two or more.

Some examples of the method, apparatuses, and non-transitory computer-readable medium described herein may further include operations, features, means, or instructions for transmitting a sidelink control message that activates a precoding configuration that the first UE and the second UE may be to apply to the sidelink connection, where the first sidelink message and the at least one second sidelink message may be transmitted according to the activated precoding configuration.

In some examples of the method, apparatuses, and non-transitory computer-readable medium described herein, receiving the indication of a precoding matrix may include operations, features, means, or instructions for receiving the indication of the precoding matrix on a resource of a physical sidelink feedback channel.

In some examples of the method, apparatuses, and non-transitory computer-readable medium described herein, the physical sidelink feedback channel includes a first resource block that includes the indication of the precoding matrix and a second resource block including hybrid automatic repeat request (HARQ) feedback data.

Some examples of the method, apparatuses, and non-transitory computer-readable medium described herein may further include operations, features, means, or instructions for transmitting, to the second UE, a sidelink control message including an indication of a subset of precoding matrices of a set of multiple precoding matrices that the second UE may be to select from based on the unprecoded reference signal, where the indicated precoding matrix may be selected from the subset of precoding matrices.

Some examples of the method, apparatuses, and non-transitory computer-readable medium described herein may further include operations, features, means, or instructions for receiving, from a base station, a downlink control message including an indication of the subset of precoding matrices, where the first UE transmits the indication of the subset of precoding matrices based on receiving the indication of the subset of precoding matrices from the base station.

In some examples of the method, apparatuses, and non-transitory computer-readable medium described herein, the downlink control message may be a radio resource control message, a medium access control layer control element message, or a downlink control information message.

In some examples of the method, apparatuses, and non-transitory computer-readable medium described herein, transmitting the first sidelink message may include operations, features, means, or instructions for transmitting the unprecoded reference signal that may be is a sidelink demodulation reference signal or a sidelink channel state information reference signal.

Some examples of the method, apparatuses, and non-transitory computer-readable medium described herein may further include operations, features, means, or instructions for receiving, from a base station, a downlink control message that indicates a sidelink configured grant configuration, where the first sidelink message and the at least one second sidelink message may be transmitted according to the sidelink configured grant configuration.

A method for wireless communications at a first UE is described. The method may include receiving, from a second UE via a sidelink connection, a first sidelink message that includes an unprecoded reference signal, transmitting, to the second UE via the sidelink connection, an indication of a precoding matrix based on the unprecoded reference signal included in the first sidelink message, and receiving, from the second UE, at least one second sidelink message that is at least partially precoded in accordance with the indication of the precoding matrix.

An apparatus for wireless communications at a first UE is described. The apparatus may include at least one processor, memory coupled with the at least one processor, and instructions stored in the memory. The instructions may be executable by the at least one processor to cause the apparatus to receive, from a second UE via a sidelink connection, a first sidelink message that includes an unprecoded reference signal, transmit, to the second UE via the sidelink connection, an indication of a precoding matrix based on the unprecoded reference signal included in the first sidelink message, and receive, from the second UE, at least one second sidelink message that is at least partially precoded in accordance with the indication of the precoding matrix.

Another apparatus for wireless communications at a first UE is described. The apparatus may include means for receiving, from a second UE via a sidelink connection, a first sidelink message that includes an unprecoded reference signal, means for transmitting, to the second UE via the sidelink connection, an indication of a precoding matrix based on the unprecoded reference signal included in the first sidelink message, and means for receiving, from the second UE, at least one second sidelink message that is at least partially precoded in accordance with the indication of the precoding matrix.

A non-transitory computer-readable medium storing code for wireless communications at a first UE is described. The code may include instructions executable by at least one processor to receive, from a second UE via a sidelink connection, a first sidelink message that includes an unprecoded reference signal, transmit, to the second UE via the sidelink connection, an indication of a precoding matrix based on the unprecoded reference signal included in the first sidelink message, and receive, from the second UE, at least one second sidelink message that is at least partially precoded in accordance with the indication of the precoding matrix.

Some examples of the method, apparatuses, and non-transitory computer-readable medium described herein may further include operations, features, means, or instructions for receiving, from the second UE, a sidelink control message that indicates a precoding configuration that the first UE may be to use for the sidelink connection, where the first sidelink message and the at least one second sidelink message may be received according to the precoding configuration.

In some examples of the method, apparatuses, and non-transitory computer-readable medium described herein, receiving the sidelink control message may include operations, features, means, or instructions for receiving an indication of a periodicity that corresponds to the precoding configuration, where the first sidelink message and the at least one second sidelink message may be received according to the periodicity and subsequent first sidelink messages include the unprecoded reference signal used for precoding matrix determination to be applied to precoding for subsequent at least one second sidelink messages.

In some examples of the method, apparatuses, and non-transitory computer-readable medium described herein, the precoding configuration further indicates an expiration time, and the first UE may be to transmit an unprecoded sidelink message upon satisfaction of the expiration time.

In some examples of the method, apparatuses, and non-transitory computer-readable medium described herein, receiving the sidelink control message may include operations, features, means, or instructions for receiving an indication of a bitmap that corresponds to a precoding pattern across a set of transmission time intervals to be used for the sidelink connection, where a first value of the bitmap corresponds to a sidelink message that includes the unprecoded reference signal and a second value of the bitmap corresponds to a sidelink message that may be at least partially precoded, where the first sidelink message and the at least one second sidelink message may be received in accordance with the bitmap.

In some examples of the method, apparatuses, and non-transitory computer-readable medium described herein, receiving the sidelink control message may include operations, features, means, or instructions for receiving an indication that sidelink control information may be to be unprecoded in the at least one second sidelink message, where the at least one second sidelink message may be transmitted with the sidelink control information being unprecoded and information of physical sidelink shared channel resources of the at least one second sidelink message being precoded.

In some examples of the method, apparatuses, and non-transitory computer-readable medium described herein, the sidelink control information that may be to be unprecoded may be type 1 sidelink control information.

In some examples of the method, apparatuses, and non-transitory computer-readable medium described herein, the precoding configuration indicates that the sidelink control information may be to be unprecoded based on the sidelink control information including a resource reservation for one or more subsequent transmissions.

In some examples of the method, apparatuses, and non-transitory computer-readable medium described herein, receiving the sidelink control message may include operations, features, means, or instructions for receiving an indication that sidelink control information may be to be precoded in the at least one second sidelink message, where the at least one second sidelink message may be transmitted with the sidelink control information being precoded and information of physical sidelink shared channel resources of the at least one second sidelink message being precoded.

In some examples of the method, apparatuses, and non-transitory computer-readable medium described herein, the sidelink control information that may be to be precoded may be type 1 sidelink control information.

In some examples of the method, apparatuses, and non-transitory computer-readable medium described herein, receiving the sidelink control message may include operations, features, means, or instructions for receiving an indication that the second UE may be to report the indication of the precoding matrix, that the at least one second sidelink message may be to be at least partially precoded, or both.

In some examples of the method, apparatuses, and non-transitory computer-readable medium described herein, receiving the sidelink control message may include operations, features, means, or instructions for receiving a type 1 sidelink control information message, a type 2 sidelink control information message, or a PC5 message.

In some examples of the method, apparatuses, and non-transitory computer-readable medium described herein, transmitting the indication of the precoding matrix may include operations, features, means, or instructions for transmitting the indication of the precoding matrix on a resource of a physical sidelink feedback channel.

In some examples of the method, apparatuses, and non-transitory computer-readable medium described herein, the physical sidelink feedback channel includes a first resource block that includes the indication of the precoding matrix and a second resource block including HARQ feedback data.

Some examples of the method, apparatuses, and non-transitory computer-readable medium described herein may further include operations, features, means, or instructions for receiving, form the second UE, a sidelink control message including an indication of a subset of precoding matrices of a set of multiple precoding matrices that the first UE may be to select from based on the unprecoded reference signal, where the indicated precoding matrix may be selected from the subset of precoding matrices.

In some examples of the method, apparatuses, and non-transitory computer-readable medium described herein, receiving the first sidelink message may include operations, features, means, or instructions for receiving the unprecoded reference signal that may be is a sidelink demodulation reference signal or a sidelink channel state information reference signal.

Some examples of the method, apparatuses, and non-transitory computer-readable medium described herein may further include operations, features, means, or instructions for measuring the unprecoded reference signal of the first sidelink message and selecting the precoding matrix based on measuring the unprecoded reference signal.

DETAILED DESCRIPTION

Figure 1:
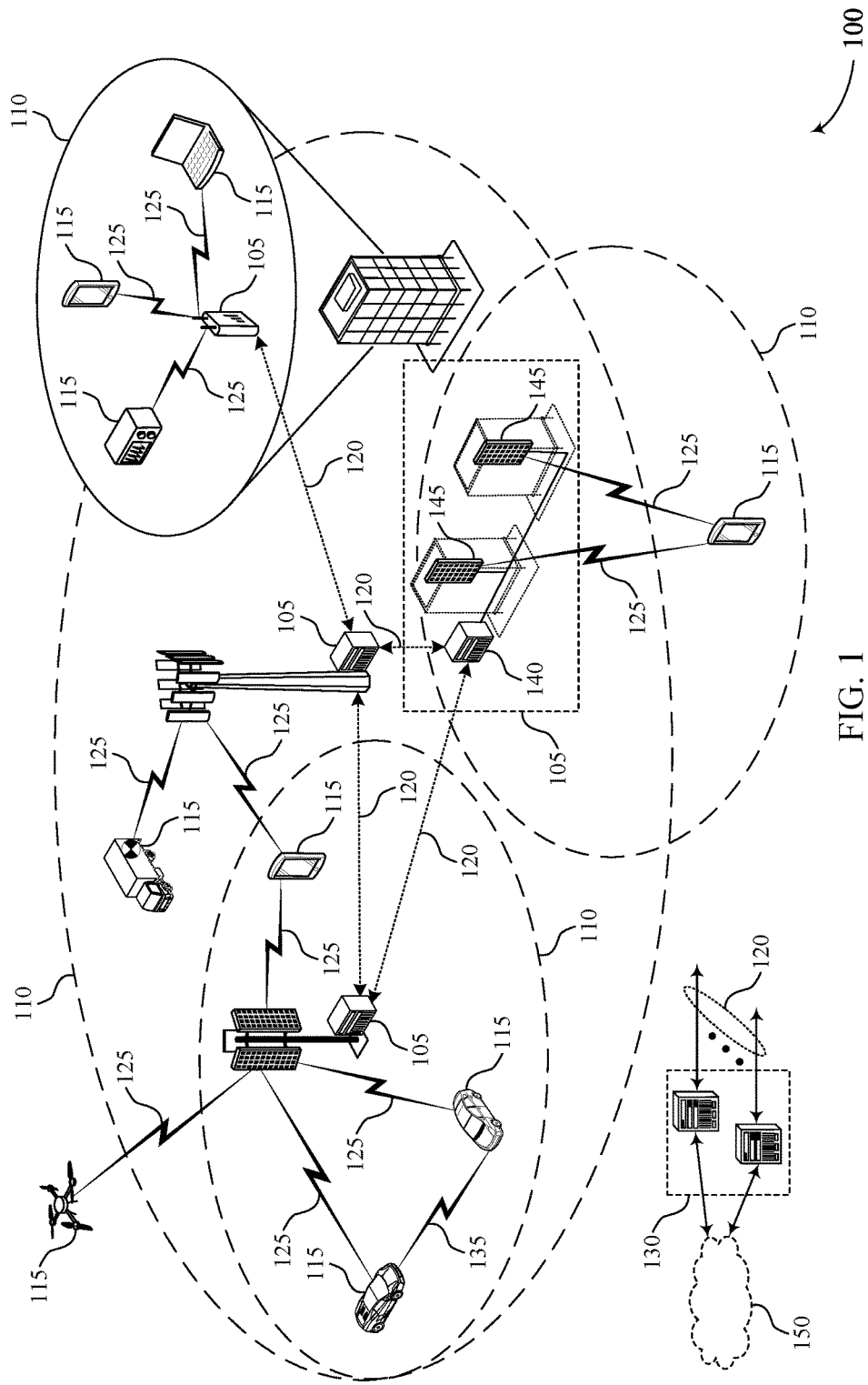
FIG. 1 illustrates an example of a wireless communications system that supports precoding for sidelink communications in accordance with aspects of the present disclosure.

Wireless communications systems may support precoded uplink and/or downlink transmissions between a user equipment (UE) and a base station. Precoding transmissions may support beam alignment between both devices and reduce interference with other communications. To determine a precoding matrix for precoding downlink communications, a base station may transmit a reference signal (e.g., a channel state information (CSI) reference signal (RS)) to a UE, and the UE may measure the reference signal and transmit an uplink precoding matrix indication (PMI) to the base station. The base station may transmit subsequent communications to the UE that are precoded using a matrix indicated by the UE via the PMI.

Some wireless communications systems may also support sidelink communications between UEs. These sidelink communications may be managed by a base station or may be scheduled by one of the sidelink UEs. Sidelink communications between UEs may be unprecoded due to implementation complexities. However, because the communications are not precoded, there may be interference between sidelink communications and other communications (e.g., other uplink, downlink, sidelink communications).

Techniques described herein support precoding in sidelink communications. A first UE and a second UE may establish a sidelink and may be configured (e.g., by a base station or by one of the sidelink UEs) with a sidelink precoding configuration. According to the configuration, the first UE may transmit, to the second UE, a sidelink message that includes an unprecoded reference signal, such as a demodulation reference signal (DMRS) or a CSI-RS. The second UE may measure the unprecoded reference signal and select a precoding matrix based on the measured reference signal. The second UE may transmit a PMI to the first UE. The first UE may transmit one or more subsequent transmissions that are at least partially precoded in accordance with the matrix indicted by the PMI. In some cases, this pattern of unprecoded message and then a set of precoded messages is periodically repeated, such that a new precoding matrix is intermittently selected. These techniques may reduce interference and improve reliability in a wireless communications system.

In some examples, sidelink control information (SCI) may be precoded or unprecoded in the at least partially precoded sidelink transmissions. The SCI may be unprecoded in order to support sidelink resource reservation techniques. More particularly, the SCI may be unprecoded so that other UEs are able to identify reserved resources indicated in the SCI. In some examples, control signaling may be used to indicate whether SCI is to be precoded or unprecoded in subsequent sidelink communications. These and other techniques are described in further detail with respect to the figures.

Aspects of the disclosure are initially described in the context of wireless communications systems. Aspects of the disclosure are further described with respect to wireless communications systems illustrating sidelink communications and process flows. Aspects of the disclosure are further illustrated by and described with reference to apparatus diagrams, system diagrams, and flowcharts that relate to precoding for sidelink communications.

FIG. 1 illustrates an example of a wireless communications system 100 that supports precoding for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support sidelink communications between UEs 115. Techniques described herein support identification of precoding matrices to use for the sidelink communications between UEs 115. For example, a first UE 115 may be configured to communicate with a second UE 115 according to a sidelink transmission pattern, where the first transmission of the pattern is unprecoded and used to select a precoding matrix. The subsequent transmissions of the transmission pattern may be at least partially precoded using the precoding matrix selected based on the first unprecoded message. A sidelink DMRS or a sidelink CSI-RS may be used for PMI selection. As such, the first UE 115 may transmit an unprecoded DMRS, and the second UE 115 may measure the unprecoded DMRS to identify a precoding matrix. The second UE 115 may transmit a PMI to the first UE 115, and the first UE 115 may transmit one or more subsequent communications that are precoded according to the PMI. These technique may support reduced interference and improved communication reliability in the wireless communications system 100

Figure 2:
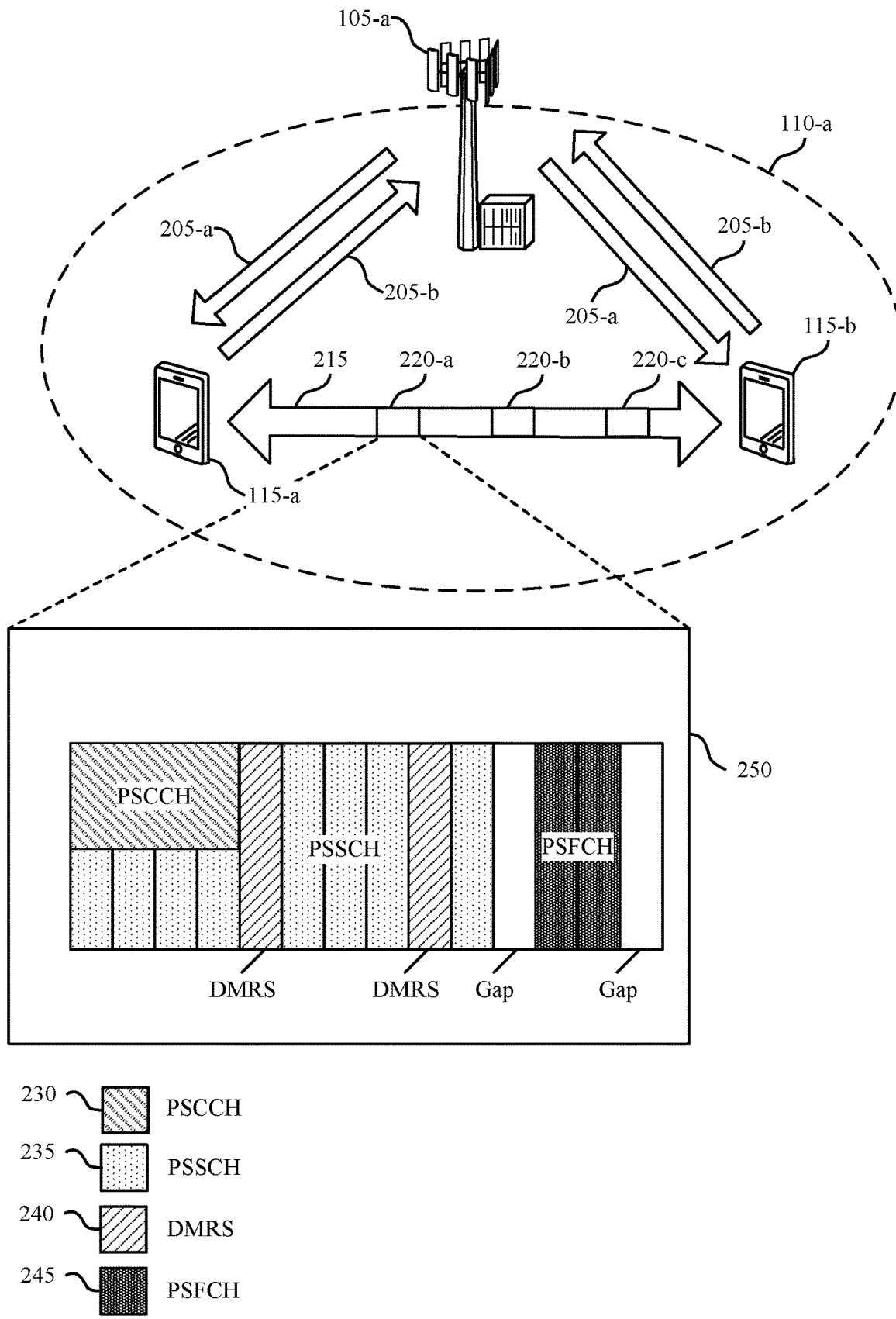
FIG. 2 illustrates an example of a wireless communications system that supports precoding for sidelink communications in accordance with aspects of the present disclosure.

FIG. 2 illustrates an example of a wireless communications system 200 that supports precoding for sidelink communications in accordance with aspects of the present disclosure. The wireless communications system 200 may include a base station 105-a, a UE 115-a, and a UE 115-b, which may be examples of base stations 105 and UEs 115 as described with reference to FIG. 1. In some examples, the base station 105-a, the UE 115-a, and the UE 115-a may be located in a geographic coverage area 110-a. The base station may communicate with the UE 115-a and the UE 115-b via downlink communication links 205-a and uplink communication links 205-b. Additionally, the UE 115-a may communicate with the UE 115-b via a sidelink communication link 215 (e.g., a PC5 link). According to techniques described herein, one or both of the UE 115-a and the UE 115-a may transmit unprecoded or precoded messages contained within transmission time intervals 220. Sidelink communication may be described as communication between two or more wireless devices (e.g., communication between the UE 115-a and the UE 115-b). To facilitate sidelink communication, the UE 115-a and the UE 115-b may be configured with a set of resources (e.g., time and frequency resources) allocated for sidelink communication within one or more sidelink resource pools.

In some examples, sidelink communication between the UE 115-a and the UE 115-b may be scheduled according to a sidelink resource allocation mode 1. During the sidelink resource allocation mode 1, the base station 105-a may indicate a set of resources within the one or more sidelink resource pools to a transmitting UE 115, and the transmitting UE 115 may utilize the set of resources for sidelink transmissions. For example, the base station 105-a may transmit, to the UE 115-a (e.g., a transmitting UE 115-a), an indication of a set of resources to use to transmit a message to the UE 115-b, and the UE 115-a may utilize one or more resources of the set to transmit the message to the UE 115-b.

Alternatively, a transmitting UE 115, such as the UE 115-a, may select resources for sidelink transmissions according to a sidelink resource allocation mode 2. During the sidelink resource allocation mode 2, the UE 115-a may select a set of resources from the one or more sidelink resource pools for sidelink transmissions autonomously (without signaling from the base station 105-a). In either case, the UE 115-a may transmit SCI to the UE 115-b indicating the selected set of resources such that the UE 115-b may locate and decode transmissions from the UE 115-a. As such, resource selection may vary between the sidelink resource allocation modes 1 and 2.

The wireless communications system 200 may support precoding of transmissions on the downlink communication links 205-a and uplink communication links 205-b. Precoding such transmissions may support beam alignment between both devices and reduce interference with other communications. To determine precoding matrices to use for precoding, a transmitting device, such as a base station 105-a may transmit a downlink reference signal such as a CSI-RS. The receiving device, such as UE 115-a, may measure the reference signal and identify a precoding matrix. The UE 115-a may transmit a PMI to the base station 105-a, and the base station 105-a may transmit subsequent communications that are precoded using the indicated precoding matrix. In some cases, such as, for example, in ultra-reliable low latency communications (URLLC) over LTE-Uu, the physical downlink shared channel (PDSCH) may be used for determining channel quality indicator (CQI) or rank indicator (RI) of the transmission. However, the DMRS of the PDSCH may be precoded in Uu transmissions, and as such, there may be no way to determine a PMI based on a DMRS in Uu transmissions.

In contrast, in sidelink communications, precoding may not be used, and the UE 115 may be transmitting communications precoded with an identity matrix. More particularly, transmissions on sidelink communication channels, such as physical sidelink shared channel (PSSCH) and physical sidelink control channels (PSCCH) transmissions may be unprecoded, and the UE 115-a and UE 115-b may use an identity matrix as the precoding matrix for the sidelink transmission. For example, according to one technique, the block of vectors [x(0)(i) . . . x(v−1)(i)]T may be precoded, where the precoding matrix W equals the identity matrix and Msymbap=Msymblayer.

Techniques described herein may be used to support precoding in sidelink communications by leveraging unprecoded signals, such DMRS, to determine precoding matrices. In some examples, uplink/downlink (e.g., Uu links) PMI tables may be used for data precoding on sidelink, which may improve sidelink transmissions quality as well as reduce interference between various communications in the wireless communications system 200.

Resources for sidelink communications may be allocated according to resource diagram 250 at transmission time interval 220-a. The transmission time intervals 220 may be examples of slots or minislots. In some examples, a UE 115-a may transmit a sidelink message to UE 115-b, over a transmission time interval 220, wherein the sidelink message includes information transmitted in various resources according to the resource diagram 250. The resource diagram includes time and frequency resources for a PSCCH 230, a PSSCH 235, a DMRS 240, and physical sidelink feedback channel (PSFCH). The same or similar resource configurations may be used for other transmission time intervals 220-b, and 220-c. The resource diagram 250 also includes gap resources, which may be used in order to change the direction of the transmissions (e.g., from UE 115-a to UE 115-b to UE 115-b to UE 115-a). Resources of the PSFCH 245 may be used by the receiving UE (e.g., UE 115-b) to transmit HARQ-ACK feedback corresponding to a PSCCH 230 transmission or a PSSCH 235 transmission.

To support the precoding techniques described herein, the UE 115-a may transmit a first sidelink message to the second UE 115-b. The first sidelink message may include a reference signal that is used for determining a precoding matrix. For example, the first sidelink message may contain an unprecoded DMRS 240. The second UE 115-b may measure the unprecoded DMRS 240 and determine a precoding matrix based on the measurement. The second UE 115-b may transmit a PMI corresponding to the determined precoding matrix to the first UE 115-a. Subsequent communications between the first UE 115-a and the second UE 115-b may be at least partially precoded according to the matrix associated with the PMI. A pattern of unprecoded and precoded (e.g., at least partially) transmissions may be configured. For example, the sidelink message of the transmission time interval 220-a (e.g., a first slot) may contain the unprecoded DMRS 240. The second UE 115-b may report the PMI as described herein, and subsequent sidelink messages transmitted during transmission time intervals 220-b and 220-c may be at least partially precoded according to the PMI. The next sidelink transmission may include the unprecoded DMRS 240 which may be used to identify and report a new PMI. In the above example, the periodicity of using the PMI may be 3 (e.g., (1) unprecoded, (2) precoded, (3) precoded). In some examples, this procedure/pattern may be repeated until expiration of a timer. In some examples, the CSI-RS may be used for PMI determination, but use of the CSI-RS may come with extra signaling (e.g., to schedule the CSI-RS).

In the subsequent precoded transmission, the information of the PSSCH 235 may be precoded or unprecoded, depending on the configuration. For example, the PSCCH 230 may contain sidelink control information type 1 (SCI-1) information, and as such, may be used by other UEs 115 to determine reserved resources. In some examples, the SCI-1 may be unprecoded when a transmitting UE 115-a is reserving multiple transmissions. In such cases, decoding the SCI-1 by other UEs 115 will allow them to identify utilized resources and may support power saving and sensing. However, in some cases, it may be desirable to precode the SCI-1 to reduce interference. As such, the transmitting UE 115 115-a may indicate to the receiving UE 115-b whether the SCI-1 is to be unprecoded or not. This information may be useful for the receiving UE 115-b in combining channels for channel estimation. For example, the receiving UE 115-b may assume a quasi co-location (QCL) relationship between transmissions and may estimate the channels using DMRS across the transmissions. The indication of whether the SCI-1 is to unprecoded or not may be included in a PC5 RRC or medium access control layer control element (MAC-CE) message. In some cases, a pattern of whether the SCI-1 is to be precoded or not for subsequent K transmissions may be indicated via a bitmap. This technique may support the UE 115-b to leverage QCL and DMRS bundling across the K transmissions for SCI-1 carried in the PSCCH 230. The SCI-1 precoding indication may also be signaled in SCI-1 or sidelink control information type 2 (SCI-2). If signaled in SCI-1 or SCI-2, then the signal may activate the unprecoded or precoded SCI-1 for a subsequent K transmissions, where K may be preconfigured via PC5 RRC or MAC-CE messaging.

In some cases, the PMI determination may be used when the number of ports used by the transmitting UE 115-a is two or more. In order to determine the precoding matrix, the receiving UE 115-b may average the covariance matrices across all resource elements, after estimating the channel from DMRS, to produce an average covariance matrix. The UE 115-b may then use that covariance matrix to determine the precoder. Additionally or alternatively, the UE 115-b may average the covariance matrices across some resource elements or resource blocks, then use the log domain to identify the rate precoder. Thus, when the transmitting UE 115-a is to use two or more ports, the UE 115-a signal activation of these techniques. When one port is used by the transmitting UE 115-a, the precoding feature may be disabled. Thus, the receiving UE 115-b may be configured to not perform PMI measurement and reporting one the number of DMRSs ports is one.

The activation or enabling of these techniques may be performed by the base station 105-a via downlink control information (DCI), RRC, or MAC-CE signaling. In some examples, the indication via RRC or MAC-CE may be a pattern or bitmap that indicates whether the next K transmissions are unprecoded or not. Additionally or alternatively, the indication activating or enabling these techniques may be signaling in SCI-1 or SCI-2, which may be used to activate these features for K transmissions between the UEs 115. The value for K may be preconfigured via RRC or MAC-CE signaling.

For sidelink mode 2, since the transmissions may be opportunistic, various signaling techniques may be used. In one example, the transmitting UE 115-a and the receiving UE 115-b may agree on a pattern and an expiration time (e.g., via sidelink control signaling). Thus, before the expiration time, the UE 115-b may transmit signals according to the precoded/unprecoded pattern. When the expiration time is satisfied, the transmitting UE 115-a may revert to transmitting unprecoded data, regardless of the pattern and the pattern restart. In another examples, the transmitting UE 115-a may indicate in SCI-1 or SCI-2 whether the receiving UE 115-b is to report PMI (e.g., meaning that the current data is precoded or unprecoded). Thus, for each transmission, the SCI-1 or SCI-2 may contain or bit or flag signaling whether the data is unprecoded or precoded. For sidelink configured grant under mode 1 sidelink (for type 1 and type 2 configured grant), since the resources may be determined by the transmitting UE 115-a for the receiving UE 115-b until configured grant cancellation, these techniques may improve transmission reliability.

Further, as described herein, patterns of precoded and unprecoded data may be used. For example, sidelink transmissions may be precoded in a cyclic manner, such that the following pattern is used:

Slot 1: No precoding→Reference signal used determine and report PMI
Slot 2: Precoding: PMI not used
Slot 3: Precoding: PMI not used
Slot 4: No precoding: Reference signal used determine and report PMI
Slot 5: Precoding: PMI not used
Slot 6: Precoding: PMI not used
Slot 7: No precoding: Reference signal used determine and report PMI The periodicity (e.g., slots/transmissions) may be signaled between the receiving UE 115-b and the transmitting UE 115-a, since the periodicity may define the times where PMI reporting is expected. In some cases, the signaling may be in the form of the periodicity (e.g., 3 in the above example) or via a bitmap. In the bitmap example, the following bitmap may include a "0" for unprecoded signals and a "1" for precoded signals: 011000111110. This bitmap be recycled and used in a cyclic manner.

In some examples, the receiving UE 115-b may report the PMI using resources of the PSFCH 245. According to some configurations, the PSFCH 245 may be allocated to a single resource block that is used for HARQ acknowledgments (ACKs) and negative acknowledgements (NACKs). According to techniques described herein, the number of resource blocks allocated may be expanded to more than one resource block such that the PMI may be reported. As such, one resource block may be used for feedback, and additional resource blocks may be used for PMI transmissions. Additionally, these resource blocks may also be used for rank indication.

Thus, the techniques described herein may support precoding in sidelink communications. Precoding may be used to improve transmission reliability and reduce interference in the sidelink. Further, as described with reference to FIG. 3A and FIG. 3B, the PMI may be restricted to a subset, which may further support reduced interference in wireless communications systems.

Figure 3A:
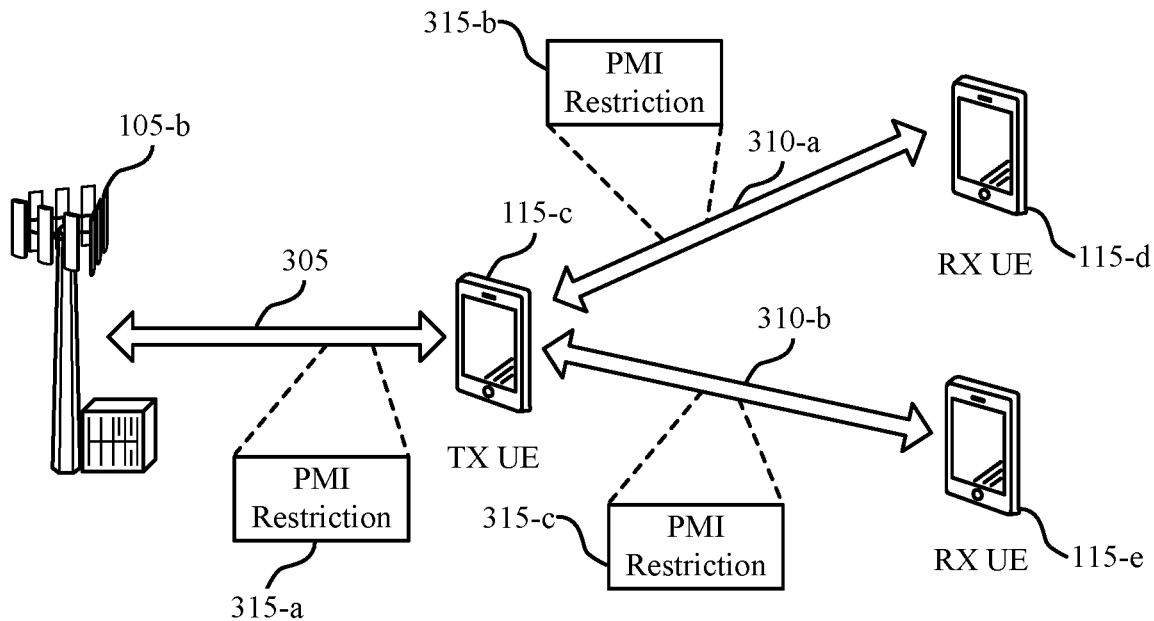
FIG. 3A and FIG. 3B illustrate examples of wireless communications systems that support precoding for sidelink communications in accordance with aspects of the present disclosure.
Figure 3B:
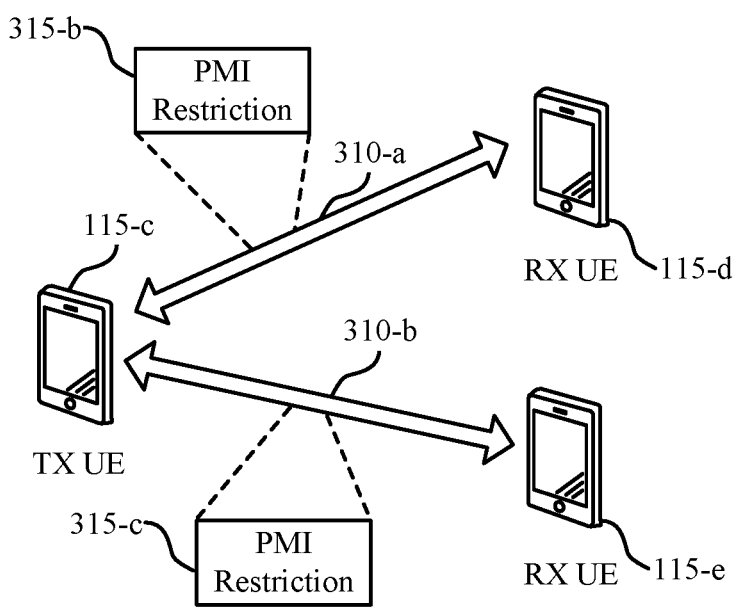

FIG. 3A and FIG. 3B illustrate examples of wireless communications systems 300 that support precoding for sidelink communications in accordance with aspects of the present disclosure. The wireless communications system 300-a includes a base station 105-b, and the wireless communications systems 300-a and 300-b include a UE 115-c, a UE 115-d, and a UE 115-e. The base station 105-b may be an example of a base station 105 as described with respect to FIGS. 1 and 2. The UEs 115-c, 115-d, and 115-e may be examples of UEs 115 described with respect to FIGS. 1 and 2. The various devices of FIGS. 3A and 3B may implement precoding for sidelink communications as described with respect to FIGS. 1 and 2. The UE 115-c may be an example of a sidelink transmitting (TX) UE, and the UEs 115-d and 115-e may be examples of sidelink receiving (RX) UEs, as described herein.

Wireless communications system 300-a may illustrate a mode 1 sidelink communication scenario. In wireless communications system 300-a, the base station 105-b may communicate with UE 115-c using a Uu link 305, which may represent various resources for uplink and downlink communications between the UE 115-c and the base station 105-c. The UE 115-c may communicate with UE 115-d over sidelink 310-a and with UE 115-e over sidelink 310-b. The sidelinks 310 may represent various resources that are used to communicate between the respective UEs 115. According to sidelink mode 1, the base station 105-b may configure the resources (e.g., using signaling over the Uu link 305) that the UE 115-c is to use for communicating via the sidelinks 310.

As described herein, in both wireless communications system 300-a and 300-b, the UE 115-c may transmit unprecoded reference signals (e.g., DMRS or CSI-RS over the sidelinks 310 that the UEs 115-d and 115-e are to measure in order to determine PMIs. The UE 115-c may then transmit subsequent communications that are at least partially precoded. In some cases, the sidelinks 310-a and 310-b may use the same or overlapping resources. In some cases, the Rx UEs 115-d and 115-e may select the same PMI. Use of the same PMI for the communications with different sidelink UEs by the UE 115-c may cause interference. As such, in order to avoid the interference, the UE 115-c may restrict the beams/PMIs at one or both of the receiving UEs 115-d and UE 115-e, such that the receiving UEs 115-d and UE 115-e do not select the same PMI and, as such, reduce or limit the potential for interfering communications by the UE 115-c.

In wireless communications system 300-a, the PMIs may be restricted by the base station 105-b and/or the UE 115-c. Thus, the base station 105-b may monitor beams used at the transmitting UEs (e.g., UE 115-c) and may send an indication of restricted PMIs (e.g., a subset of configured PMIs) via PMI restriction indication 315-a. In some examples, the base station 105-b may monitor angle of departure (AoD) and/or angle of arrival (AoA) schemes as the UE 115-c in order to determine the PMI restrictions. Further, the base station 105-b may use data regarding previous PMI feedbacks from the various UEs 115 in order to determine the PMI restrictions. Dependent on the scenario, the base station 105-b may send the indication of the subset restriction (e.g., via PMI restriction indication 315-a) directly to the receiving UEs 115-d and 115-e or may send the indication of the subset restriction to the transmitting UE 115-c, which may relay the indications (e.g., via the PMI restriction indications 315-b and 315-c) to the receiving UEs 115-d and 115-e. For example, if the receiving UEs 115-d and 115-e are within coverage of the base station 105-b, then the base station 105-b may send the indication of the subset restriction (e.g., PMI restriction indication 315-a) directly to the receiving UEs 115-d and 115-e. If the receiving UEs 115-d are out of coverage of the base station 105-b, then the base station 150-b may send the indication of the subset restriction (e.g., PMI restriction indication 315-a) to the transmitting UE 115-c, which may relay the indication to the receiving UEs 115-d and 115-e via the respective PMI restriction indications 315-b and 315-c. In some examples, the base station 105-b may enable or disable PMI or beam restriction using RRC or MAC-CE signaling. Additionally, the transmitting UE 115-c may enable or disable PMI or beam restriction for the receiving UEs 115-d and 115-e using RRC, MAC-CE or via SCI indication.

Similar techniques may be used to restrict beams that each of the UE 115 are to use for the sidelink connection. Thus, the base station 105-b and/or the UE 115-c may restrict the beams on the sidelink connections 310 such that the selected PMIs are different. Thus, using beam restrictions may also support different PMIs and, as such, reduced interference.

For mode 2 sidelink communications, as illustrated in wireless communications system 300-b, the transmitting UE 115-c may autonomously determine the PMI or beam restrictions. The UE 115-c may utilize previous PMI indications and prior communication data in order to determine the PMI restrictions. The UE 115-c may use RRC, MAC-CE, or SCI indications to transmit the PMI restriction indications 315-a and 315-b and/or to enable or disable the PMI restriction. Thus, using these PMI restriction techniques, interference between communications in the wireless communications systems 300 may be reduced.

Figure 4:
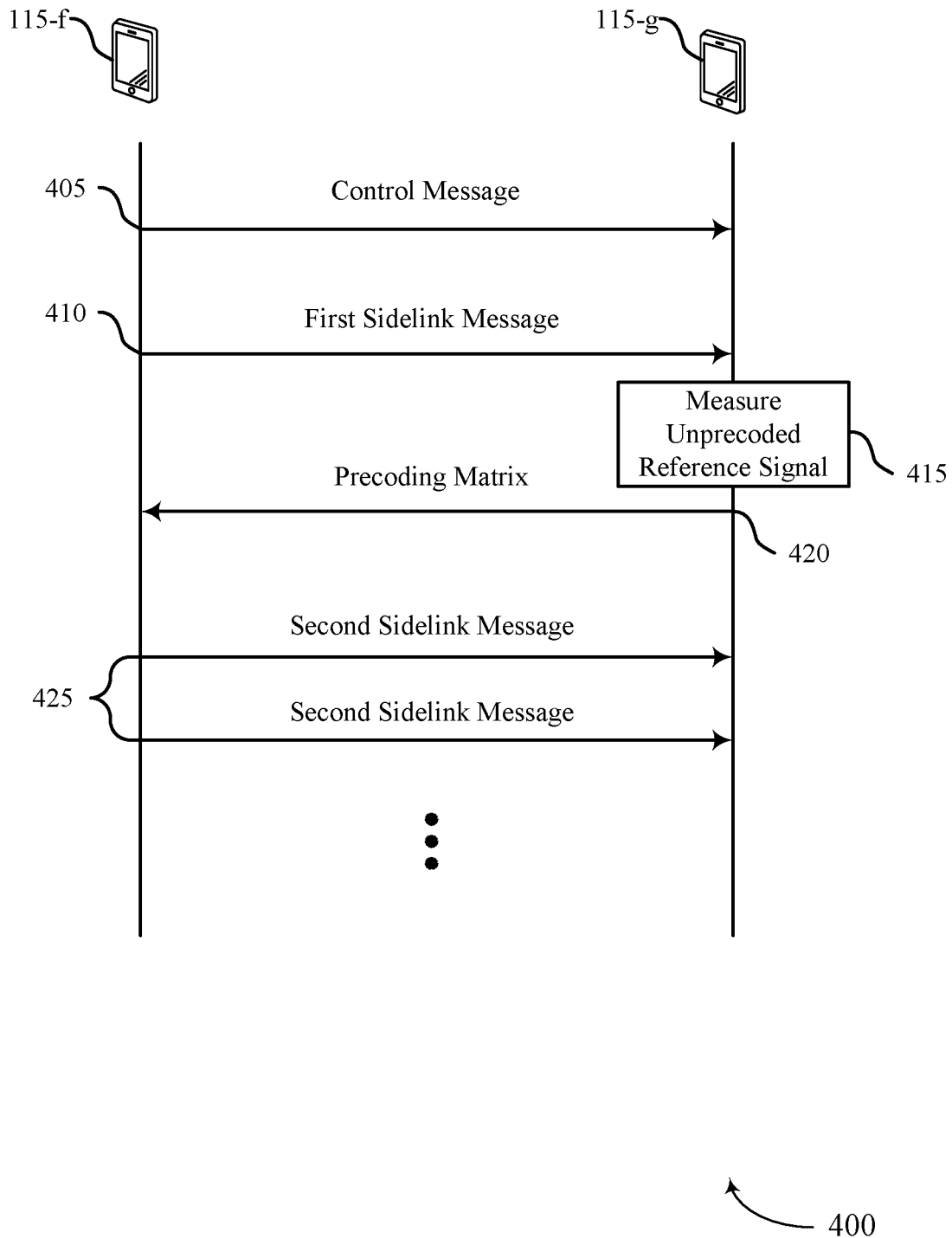
FIG. 4 illustrates an example of process flow that supports precoding for sidelink communications in accordance with aspects of the present disclosure.

FIG. 4 illustrates an example of a process flow 400 that supports precoding for sidelink communications in accordance with aspects of the present disclosure. In some examples, process flow 400 may implement aspects of wireless communications systems 100, 200, and 300 as described with reference to FIGS. 1 through 3. Process flow 400 may include a first UE 115-f and a second UE 115-g, which may be examples of UEs 115, as described with reference to FIGS. 1 through 3.

The process flow 400 illustrates an exemplary order of actions performed by the UE 115-f and UE 115-g to perform sidelink communications. In the following description of the process flow 400, the operations between the UE 115-f and the UE 115-g may be transmitted in a different order than the exemplary order shown, or the operations performed by the UE 115-f and the UE 115-g may be performed in different orders or at different times. Certain operations may also be omitted from the process flow 400, and/or other operations may be added to the process flow 400.

At 405, the first UE 115-f may transmit, to the second UE 115-g, a sidelink control message that indicates a precoding configuration that the first UE 115-f is to use for a sidelink connection. Various precoding configurations may be transmitted at 305. For example, the sidelink control message may include an indication of a periodicity that corresponds to the precoding configuration such that a pattern of unprecoded and precoded sidelink messages are transmitted according to the periodicity. The precoding configuration may include an expiration time when a cyclic precoding pattern (e.g., periodicity) is to end. The sidelink control message may include an indication of a bitmap that corresponds to a precoding pattern to be used for the sidelink connection, where a first value (e.g., "0") of the bitmap may correspond to a sidelink message that includes the unprecoded reference signal and a second value (e.g., "1") of the bitmap may correspond to a sidelink message that is at least partially precoded. The bitmap may be a time-domain bitmap where each value indicates whether a transmission is precoded or unprecoded in each transmission time interval (e.g., slot, occasion, time unit, duration) of a set of transmission time intervals.

The precoding configuration indicated by the control message may indicate that sidelink control information (e.g., SCI-1) is to be unprecoded. In some examples, the sidelink control information is to be unprecoded when the sidelink control information includes a resource reservation for one or more subsequent transmissions or when the first UE 115-f operating according to a mode 1 sidelink procedure. In some examples, the control message may indicate that the sidelink control information (e.g., SCI-1) is to be precoded.

The sidelink control message may indicate that the second UE is to report the indication of the precoding matrix, or that the at least one second sidelink message is to be at least partially precoded (e.g., such that the precoding matrix is reported), or both. The sidelink control message may be an example of an SCI-1, SCI-2, PC5 message, or a combination thereof. In some examples, the sidelink control message 405 may indicate the precoding configuration when the number of ports used for sidelink transmissions is two or more. In some examples, the sidelink control message may activate a precoding configuration (e.g., precoding configuration that is configured via a prior control message).

At 410, the first UE 115-f may transmit, to the second UE 115-g via the sidelink connection, a first sidelink message that includes an unprecoded reference signal. The unprecoded reference signal may be an example of a sidelink DMRS or a sidelink CSI-RS. At 415, the second UE 115-g may measure the unprecoded reference signal to determine a precoding matrix.

At 420, the second UE 115-g may transmit to the first UE 115-f via the sidelink connection, an indication of the precoding matrix (e.g., determined based on the measured reference signal). The indication of the precoding matrix may be transmitted on a resource of a PSFCH. The PSFCH may be configured to include a first resource block that may further include the indication of the precoding matrix and a second resource block including HARQ feedback data. As such, the PSFCH may include the precoding matrix indication as well as ACK/NACK indications corresponding to data transmissions (e.g., included in a PSSCH)

At 425, the first UE 115-f may transmit, to the second UE 115-g, at least one second sidelink message that is at least partially precoded in accordance with the indication of the precoding matrix received at 415. The sidelink control information (e.g., SCI-1) may be precoded or not in the at least one sidelink message in accordance with the precoding configuration. Information included in the PSSCH resources of the sidelink message may be precoded in accordance with the indication of the precoding matrix. A cyclic pattern or period of first sidelink messages, precoding matrix indications, and at least one second sidelink messages may be transmitted based on the precoding configuration of the sidelink control message. For example, if the configured periodicity is three, then the first UE 115-f may transmit the first sidelink message (e.g., with the unprecoded reference signal) then two second sidelink messages (e.g., at least partially precoded). This pattern may be repeated. In some examples, the pattern or period of sidelink messages may be transmitted until expiration of a timer (e.g., configured via the precoding configuration), after which the sidelink messages are unprecoded until reconfiguration or reactivation (e.g., via another control message).

Figure 5:
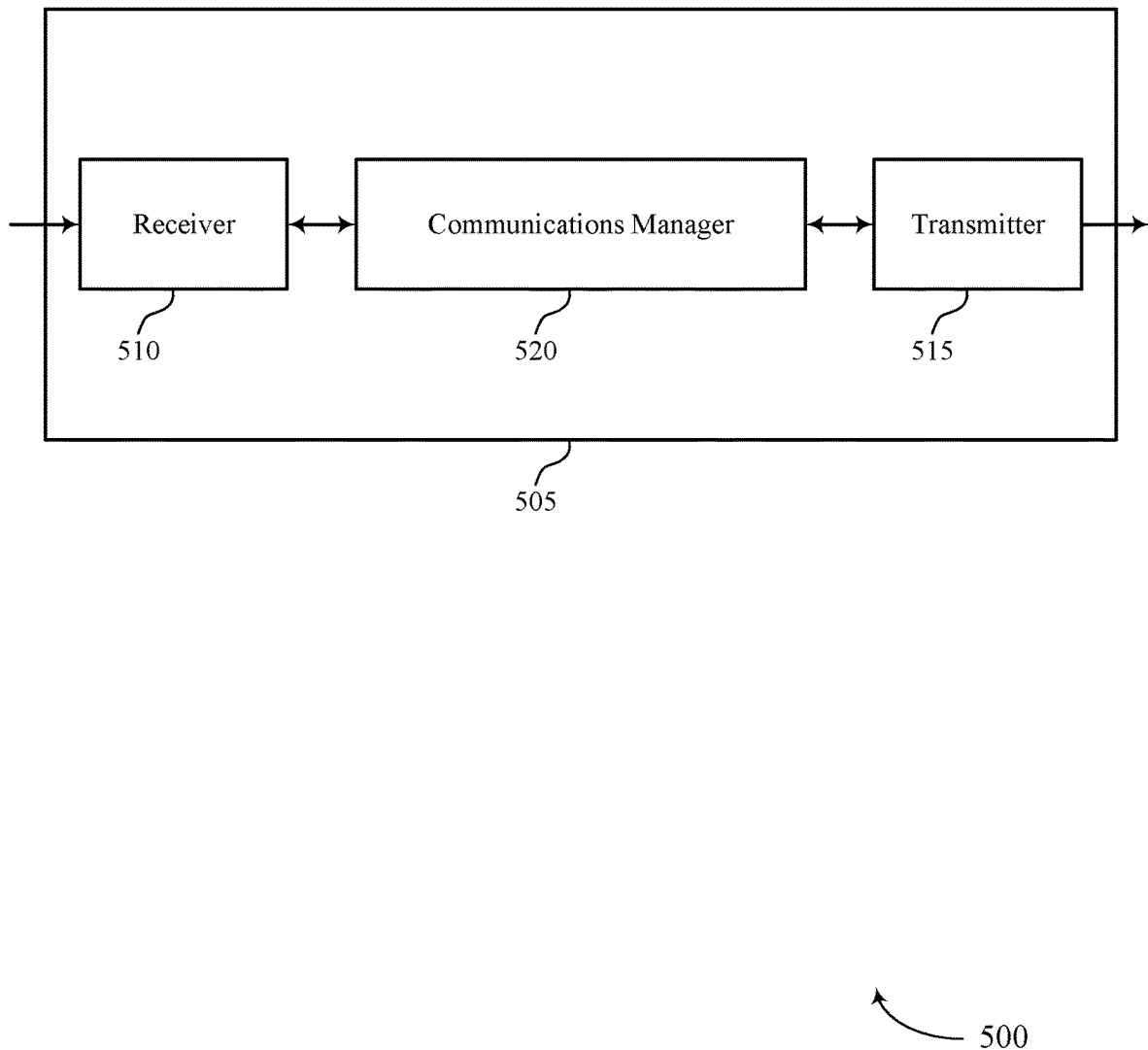
FIGS. 5 and 6 show block diagrams of devices that support precoding for sidelink communications in accordance with aspects of the present disclosure.

FIG. 5 shows a block diagram 500 of a device 505 that supports precoding for sidelink communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to precoding for sidelink communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to precoding for sidelink communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of precoding for sidelink communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for transmitting, to a second UE via a sidelink connection, a first sidelink message that includes an unprecoded reference signal. The communications manager 520 may be configured as or otherwise support a means for receiving, from the second UE via the sidelink connection, an indication of a precoding matrix based on the unprecoded reference signal included in the first sidelink message. The communications manager 520 may be configured as or otherwise support a means for transmitting, to the second UE, at least one second sidelink message that is at least partially precoded in accordance with the indication of the precoding matrix.

Additionally or alternatively, the communications manager 520 may support wireless communications at a first UE in accordance with examples as disclosed herein. For example, the communications manager 520 may be configured as or otherwise support a means for receiving, from a second UE via a sidelink connection, a first sidelink message that includes an unprecoded reference signal. The communications manager 520 may be configured as or otherwise support a means for transmitting, to the second UE via the sidelink connection, an indication of a precoding matrix based on the unprecoded reference signal included in the first sidelink message. The communications manager 520 may be configured as or otherwise support a means for receiving, from the second UE, at least one second sidelink message that is at least partially precoded in accordance with the indication of the precoding matrix.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources by reducing interference (e.g., thus avoiding repeated transmissions) using precoding in sidelink communications.

Figure 6:
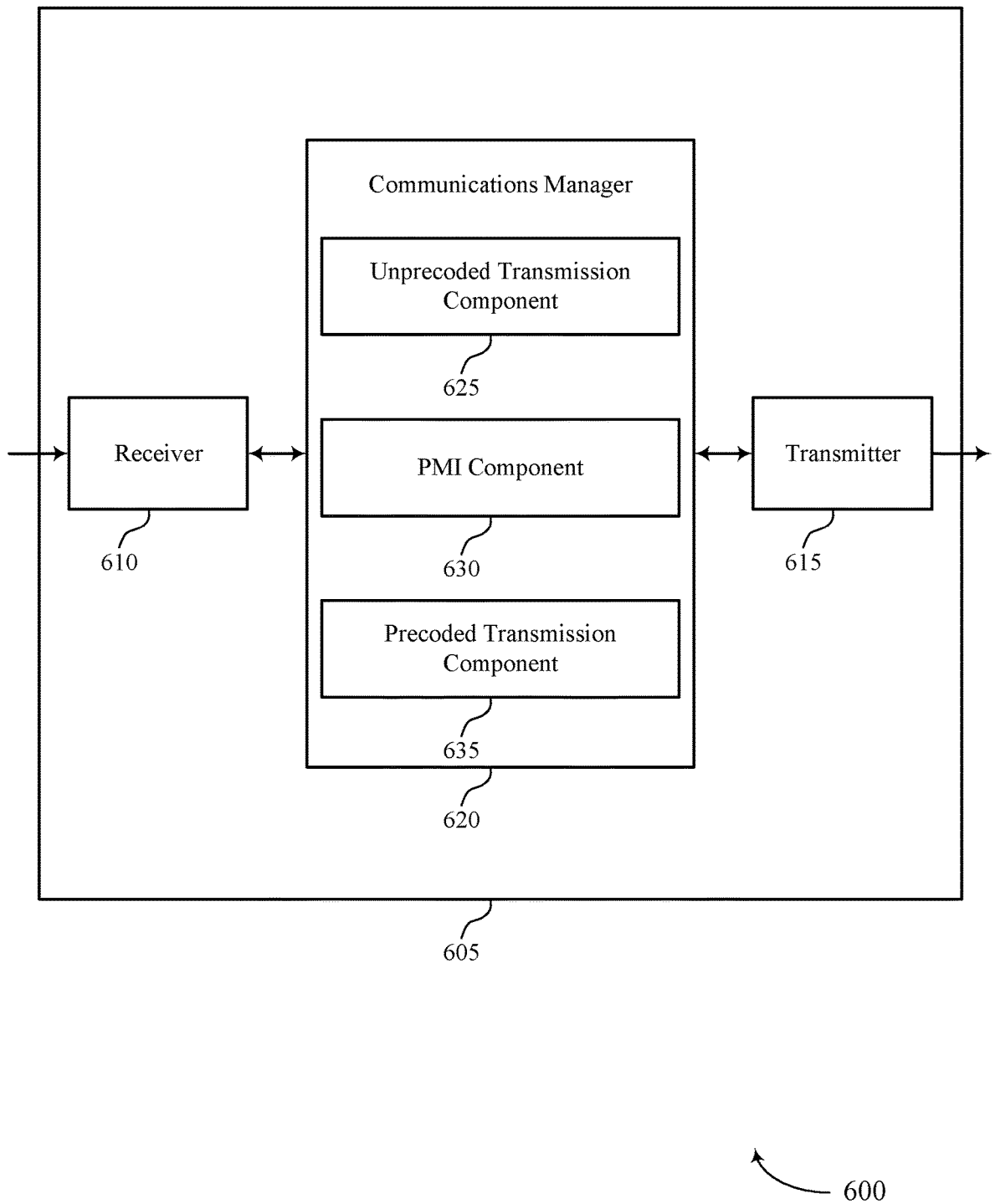

FIG. 6 shows a block diagram 600 of a device 605 that supports precoding for sidelink communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to precoding for sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to precoding for sidelink communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of precoding for sidelink communications as described herein. For example, the communications manager 620 may include an unprecoded transmission component 625, a PMI component 630, a precoded transmission component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The unprecoded transmission component 625 may be configured as or otherwise support a means for transmitting, to a second UE via a sidelink connection, a first sidelink message that includes an unprecoded reference signal. The PMI component 630 may be configured as or otherwise support a means for receiving, from the second UE via the sidelink connection, an indication of a precoding matrix based on the unprecoded reference signal included in the first sidelink message. The precoded transmission component 635 may be configured as or otherwise support a means for transmitting, to the second UE, at least one second sidelink message that is at least partially precoded in accordance with the indication of the precoding matrix.

Additionally or alternatively, the communications manager 620 may support wireless communications at a first UE in accordance with examples as disclosed herein. The unprecoded transmission component 625 may be configured as or otherwise support a means for receiving, from a second UE via a sidelink connection, a first sidelink message that includes an unprecoded reference signal. The PMI component 630 may be configured as or otherwise support a means for transmitting, to the second UE via the sidelink connection, an indication of a precoding matrix based on the unprecoded reference signal included in the first sidelink message. The precoded transmission component 635 may be configured as or otherwise support a means for receiving, from the second UE, at least one second sidelink message that is at least partially precoded in accordance with the indication of the precoding matrix.

Figure 7:
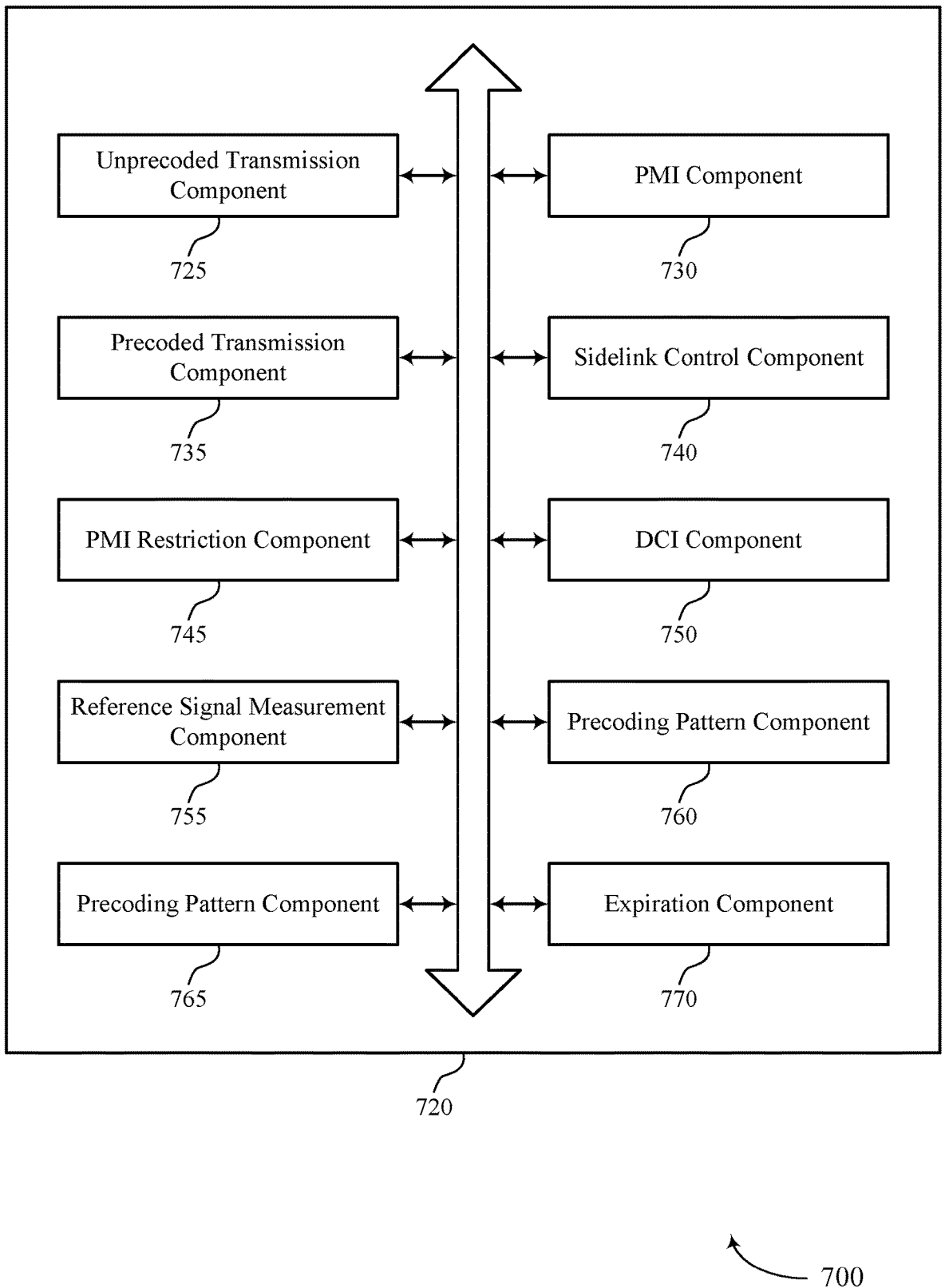
FIG. 7 shows a block diagram of a communications manager that supports precoding for sidelink communications in accordance with aspects of the present disclosure.

FIG. 7 shows a block diagram 700 of a communications manager 720 that supports precoding for sidelink communications in accordance with aspects of the present disclosure. The communications manager 720 may be an example of aspects of a communications manager 520, a communications manager 620, or both, as described herein. The communications manager 720, or various components thereof, may be an example of means for performing various aspects of precoding for sidelink communications as described herein. For example, the communications manager 720 may include an unprecoded transmission component 725, a PMI component 730, a precoded transmission component 735, a sidelink control component 740, a PMI restriction component 745, a DCI component 750, a reference signal measurement component 755, a precoding pattern component 760, a precoding pattern component 765, an expiration component 770, or any combination thereof. Each of these components may communicate, directly or indirectly, with one another (e.g., via one or more buses).

The communications manager 720 may support wireless communications at a first UE in accordance with examples as disclosed herein. The unprecoded transmission component 725 may be configured as or otherwise support a means for transmitting, to a second UE via a sidelink connection, a first sidelink message that includes an unprecoded reference signal. The PMI component 730 may be configured as or otherwise support a means for receiving, from the second UE via the sidelink connection, an indication of a precoding matrix based on the unprecoded reference signal included in the first sidelink message. The precoded transmission component 735 may be configured as or otherwise support a means for transmitting, to the second UE, at least one second sidelink message that is at least partially precoded in accordance with the indication of the precoding matrix.

In some examples, the sidelink control component 740 may be configured as or otherwise support a means for transmitting, to the second UE, a sidelink control message that indicates a precoding configuration that the first UE is to use for the sidelink connection, where the first sidelink message and the at least one second sidelink message are transmitted according to the precoding configuration.

In some examples, to support transmitting the sidelink control message, the sidelink control component 740 may be configured as or otherwise support a means for transmitting an indication of a periodicity that corresponds to the precoding configuration, where the first sidelink message and the at least one second sidelink message are transmitted according to the periodicity and subsequent first sidelink messages include the unprecoded reference signal used for precoding matrix determination to be applied to precoding for subsequent second sidelink messages.

In some examples, the precoding configuration further indicates an expiration time. In some examples, the first UE is to transmit an unprecoded sidelink message upon satisfaction of the expiration time.

In some examples, the precoding configuration indicates the expiration time based on the first UE and the second UE operating according to a sidelink mode 2 procedure.

In some examples, to support transmitting the sidelink control message, the precoding pattern component 760 may be configured as or otherwise support a means for transmitting an indication of a bitmap that corresponds to a precoding pattern across a set of transmission time intervals to be used for the sidelink connection, where a first value of the bitmap corresponds to a sidelink message that includes the unprecoded reference signal and a second value of the bitmap corresponds to a sidelink message that is at least partially precoded, where the first sidelink message and the at least one second sidelink message are transmitted in accordance with the bitmap.

In some examples, to support transmitting the sidelink control message, the sidelink control component 740 may be configured as or otherwise support a means for transmitting an indication that sidelink control information is to be unprecoded in the at least one second sidelink message, where the at least one second sidelink message is transmitted with the sidelink control information being unprecoded and information of physical sidelink shared channel resources of the at least one second sidelink message being precoded.

In some examples, the sidelink control information that is to be unprecoded is type 1 sidelink control information.

In some examples, the precoding configuration indicates that the sidelink control information is to be unprecoded based on the sidelink control information includes a resource reservation for one or more subsequent transmissions.

In some examples, the precoding configuration indicates that the sidelink control information is to be unprecoded based on the first UE operating according to a mode 1 sidelink procedure.

In some examples, to support transmitting the sidelink control message, the sidelink control component 740 may be configured as or otherwise support a means for transmitting an indication that sidelink control information is to be precoded in the at least one second sidelink message, where the at least one second sidelink message is transmitted with the sidelink control information being precoded and information of physical sidelink shared channel resources of the at least one second sidelink message being precoded.

In some examples, the sidelink control information that is to be precoded is type 1 sidelink control information.

In some examples, to support transmitting the sidelink control message, the PMI component 730 may be configured as or otherwise support a means for transmitting an indication that the second UE is to report the indication of the precoding matrix, that the at least one second sidelink message is to be at least partially precoded, or both.

In some examples, to support transmitting the sidelink control message, the sidelink control component 740 may be configured as or otherwise support a means for transmitting a type 1 sidelink control information message, a type 2 sidelink control information message, or a PC5 message.

In some examples, to support transmitting the sidelink control message, the sidelink control component 740 may be configured as or otherwise support a means for transmitting the sidelink control message that indicates the precoding configuration when a number of ports to be used for sidelink transmissions on the sidelink connection is two or more.

In some examples, the sidelink control component 740 may be configured as or otherwise support a means for transmitting a sidelink control message that activates a precoding configuration that the first UE and the second UE are to apply to the sidelink connection, where the first sidelink message and the at least one second sidelink message are transmitted according to the activated precoding configuration.

In some examples, to support receiving the indication of a precoding matrix, the PMI component 730 may be configured as or otherwise support a means for receiving the indication of the precoding matrix on a resource of a physical sidelink feedback channel.

In some examples, the physical sidelink feedback channel includes a first resource block that includes the indication of the precoding matrix and a second resource block including HARQ feedback data.

In some examples, the PMI restriction component 745 may be configured as or otherwise support a means for transmitting, to the second UE, a sidelink control message including an indication of a subset of precoding matrices of a set of multiple precoding matrices that the second UE is to select from based on the unprecoded reference signal, where the indicated precoding matrix is selected from the subset of precoding matrices.

In some examples, the PMI restriction component 745 may be configured as or otherwise support a means for receiving, from a base station, a downlink control message including an indication of the subset of precoding matrices, where the first UE transmits the indication of the subset of precoding matrices based on receiving the indication of the subset of precoding matrices from the base station.

In some examples, the downlink control message is a radio resource control message, a medium access control layer control element message, or a downlink control information message.

In some examples, to support transmitting the first sidelink message, the unprecoded transmission component 725 may be configured as or otherwise support a means for transmitting the unprecoded reference signal that is a sidelink demodulation reference signal or a sidelink channel state information reference signal.

In some examples, the DCI component 750 may be configured as or otherwise support a means for receiving, from a base station, a downlink control message that indicates a sidelink configured grant configuration, where the first sidelink message and the at least one second sidelink message are transmitted according to the sidelink configured grant configuration.

Additionally or alternatively, the communications manager 720 may support wireless communications at a first UE in accordance with examples as disclosed herein. In some examples, the unprecoded transmission component 725 may be configured as or otherwise support a means for receiving, from a second UE via a sidelink connection, a first sidelink message that includes an unprecoded reference signal. In some examples, the PMI component 730 may be configured as or otherwise support a means for transmitting, to the second UE via the sidelink connection, an indication of a precoding matrix based on the unprecoded reference signal included in the first sidelink message. In some examples, the precoded transmission component 735 may be configured as or otherwise support a means for receiving, from the second UE, at least one second sidelink message that is at least partially precoded in accordance with the indication of the precoding matrix.

In some examples, the sidelink control component 740 may be configured as or otherwise support a means for receiving, from the second UE, a sidelink control message that indicates a precoding configuration that the first UE is to use for the sidelink connection, where the first sidelink message and the at least one second sidelink message are received according to the precoding configuration.

In some examples, to support receiving the sidelink control message, the sidelink control component 740 may be configured as or otherwise support a means for receiving an indication of a periodicity that corresponds to the precoding configuration, where the first sidelink message and the at least one second sidelink message are received according to the periodicity and subsequent first sidelink messages include the unprecoded reference signal used for precoding matrix determination to be applied to precoding for subsequent at least one second sidelink messages.

In some examples, the precoding configuration further indicates an expiration time. In some examples, the first UE is to transmit an unprecoded sidelink message upon satisfaction of the expiration time.

In some examples, to support receiving the sidelink control message, the precoding pattern component 765 may be configured as or otherwise support a means for receiving an indication of a bitmap that corresponds to a precoding pattern across a set of transmission time intervals to be used for the sidelink connection, where a first value of the bitmap corresponds to a sidelink message that includes the unprecoded reference signal and a second value of the bitmap corresponds to a sidelink message that is at least partially precoded, where the first sidelink message and the at least one second sidelink message are received in accordance with the bitmap.

In some examples, to support receiving the sidelink control message, the sidelink control component 740 may be configured as or otherwise support a means for receiving an indication that sidelink control information is to be unprecoded in the at least one second sidelink message, where the at least one second sidelink message is transmitted with the sidelink control information being unprecoded and information of physical sidelink shared channel resources of the at least one second sidelink message being precoded.

In some examples, the sidelink control information that is to be unprecoded is type 1 sidelink control information.

In some examples, the precoding configuration indicates that the sidelink control information is to be unprecoded based on the sidelink control information including a resource reservation for one or more subsequent transmissions.

In some examples, to support receiving the sidelink control message, the sidelink control component 740 may be configured as or otherwise support a means for receiving an indication that sidelink control information is to be precoded in the at least one second sidelink message, where the at least one second sidelink message is transmitted with the sidelink control information being precoded and information of physical sidelink shared channel resources of the at least one second sidelink message being precoded.

In some examples, the sidelink control information that is to be precoded is type 1 sidelink control information.

In some examples, to support receiving the sidelink control message, the PMI component 730 may be configured as or otherwise support a means for receiving an indication that the second UE is to report the indication of the precoding matrix, that the at least one second sidelink message is to be at least partially precoded, or both.

In some examples, to support receiving the sidelink control message, the sidelink control component 740 may be configured as or otherwise support a means for receiving a type 1 sidelink control information message, a type 2 sidelink control information message, or a PC5 message.

In some examples, to support transmitting the indication of the precoding matrix, the PMI component 730 may be configured as or otherwise support a means for transmitting the indication of the precoding matrix on a resource of a physical sidelink feedback channel.

In some examples, the physical sidelink feedback channel includes a first resource block that includes the indication of the precoding matrix and a second resource block including HARQ feedback data.

In some examples, the PMI restriction component 745 may be configured as or otherwise support a means for receiving, form the second UE, a sidelink control message including an indication of a subset of precoding matrices of a set of multiple precoding matrices that the first UE is to select from based on the unprecoded reference signal, where the indicated precoding matrix is selected from the subset of precoding matrices.

In some examples, to support receiving the first sidelink message, the unprecoded transmission component 725 may be configured as or otherwise support a means for receiving the unprecoded reference signal that is a sidelink demodulation reference signal or a sidelink channel state information reference signal.

In some examples, the reference signal measurement component 755 may be configured as or otherwise support a means for measuring the unprecoded reference signal of the first sidelink message. In some examples, the PMI component 730 may be configured as or otherwise support a means for selecting the precoding matrix based on measuring the unprecoded reference signal.

Figure 8:
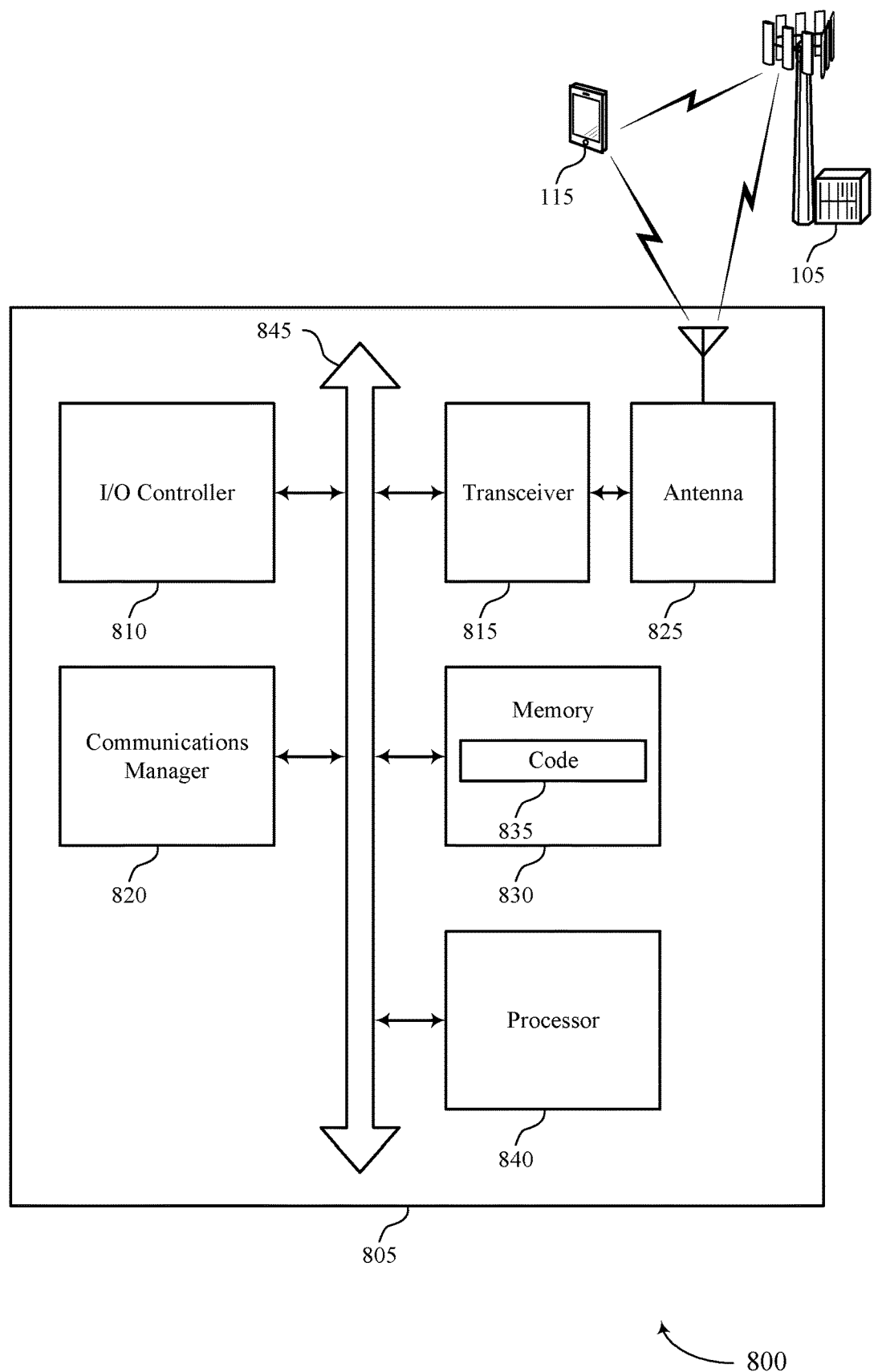
FIG. 8 shows a diagram of a system including a device that supports precoding for sidelink communications in accordance with aspects of the present disclosure.

FIG. 8 shows a diagram of a system 800 including a device 805 that supports precoding for sidelink communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting precoding for sidelink communications). For example, the device 805 or a component of the device 805 may include a processor 840 and memory 830 coupled to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for transmitting, to a second UE via a sidelink connection, a first sidelink message that includes an unprecoded reference signal. The communications manager 820 may be configured as or otherwise support a means for receiving, from the second UE via the sidelink connection, an indication of a precoding matrix based on the unprecoded reference signal included in the first sidelink message. The communications manager 820 may be configured as or otherwise support a means for transmitting, to the second UE, at least one second sidelink message that is at least partially precoded in accordance with the indication of the precoding matrix.

Additionally or alternatively, the communications manager 820 may support wireless communications at a first UE in accordance with examples as disclosed herein. For example, the communications manager 820 may be configured as or otherwise support a means for receiving, from a second UE via a sidelink connection, a first sidelink message that includes an unprecoded reference signal. The communications manager 820 may be configured as or otherwise support a means for transmitting, to the second UE via the sidelink connection, an indication of a precoding matrix based on the unprecoded reference signal included in the first sidelink message. The communications manager 820 may be configured as or otherwise support a means for receiving, from the second UE, at least one second sidelink message that is at least partially precoded in accordance with the indication of the precoding matrix.

By including or configuring the communications manager 820 in accordance with examples as described herein, the device 805 may support techniques for more efficient utilization of communication resources and improved communication reliability by reducing interference (e.g., thus avoiding repeated transmissions) using precoding in sidelink communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of precoding for sidelink communications as described herein, or the processor 840 and the memory 830 may be otherwise configured to perform or support such operations.

Figure 9:
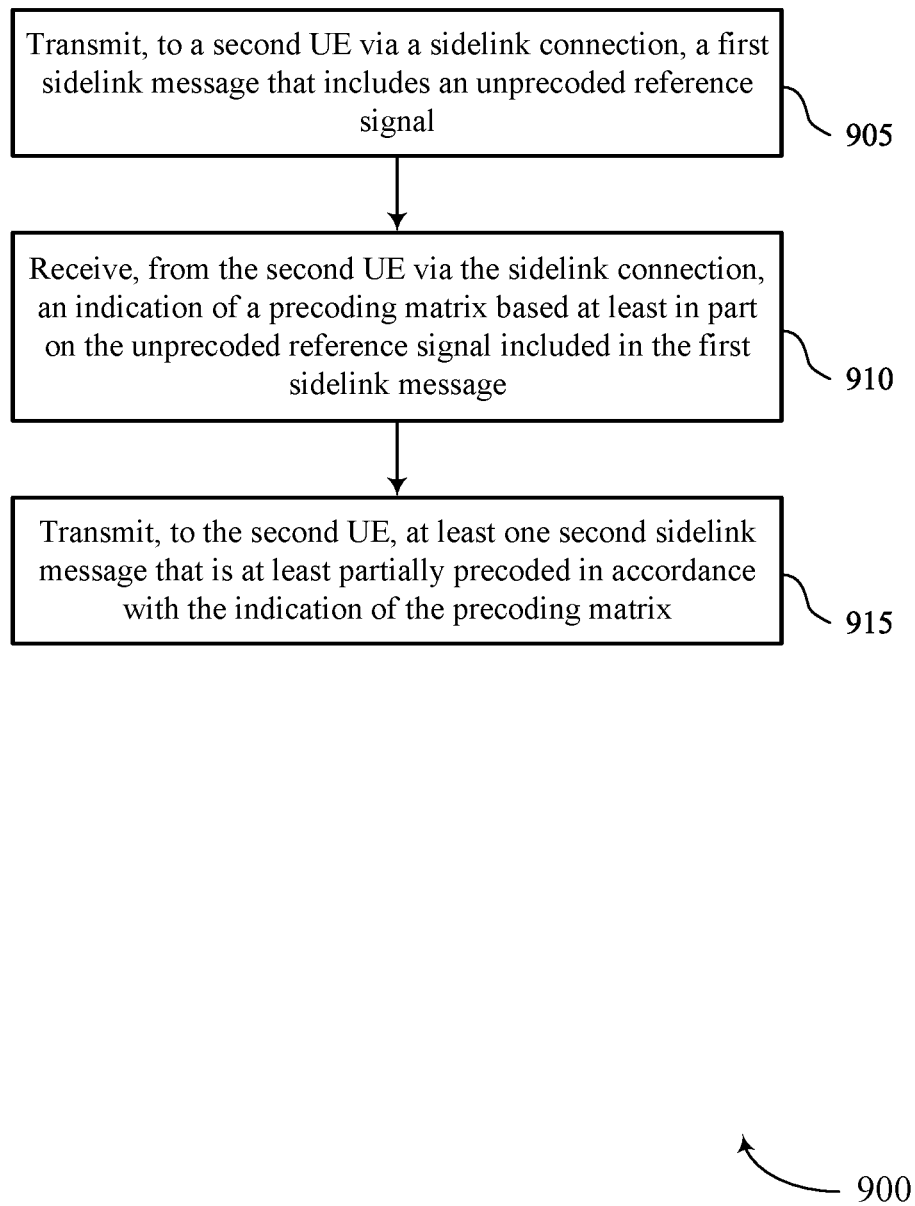
FIGS. 9 through 11 show flowcharts illustrating methods that support precoding for sidelink communications in accordance with aspects of the present disclosure.

FIG. 9 shows a flowchart illustrating a method 900 that supports precoding for sidelink communications in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include transmitting, to a second UE via a sidelink connection, a first sidelink message that includes an unprecoded reference signal. The operations of 905 may be performed in accordance with examples as disclosed herein. In some examples, aspects of the operations of 905 may be performed by an unprecoded transmission component 725 as described with reference to FIG. 7.

At 910, the method may include receiving, from the second UE via the sidelink connection, an indication of a precoding matrix based at least in part on the unprecoded reference signal included in the first sidelink message. The operations of 910 may be performed in accordance with examples as disclosed herein. In some examples, aspects of the operations of 910 may be performed by a PMI component 730 as described with reference to FIG. 7.

At 915, the method may include transmitting, to the second UE, at least one second sidelink message that is at least partially precoded in accordance with the indication of the precoding matrix. The operations of 915 may be performed in accordance with examples as disclosed herein. In some examples, aspects of the operations of 915 may be performed by a precoded transmission component 735 as described with reference to FIG. 7.

Figure 10:
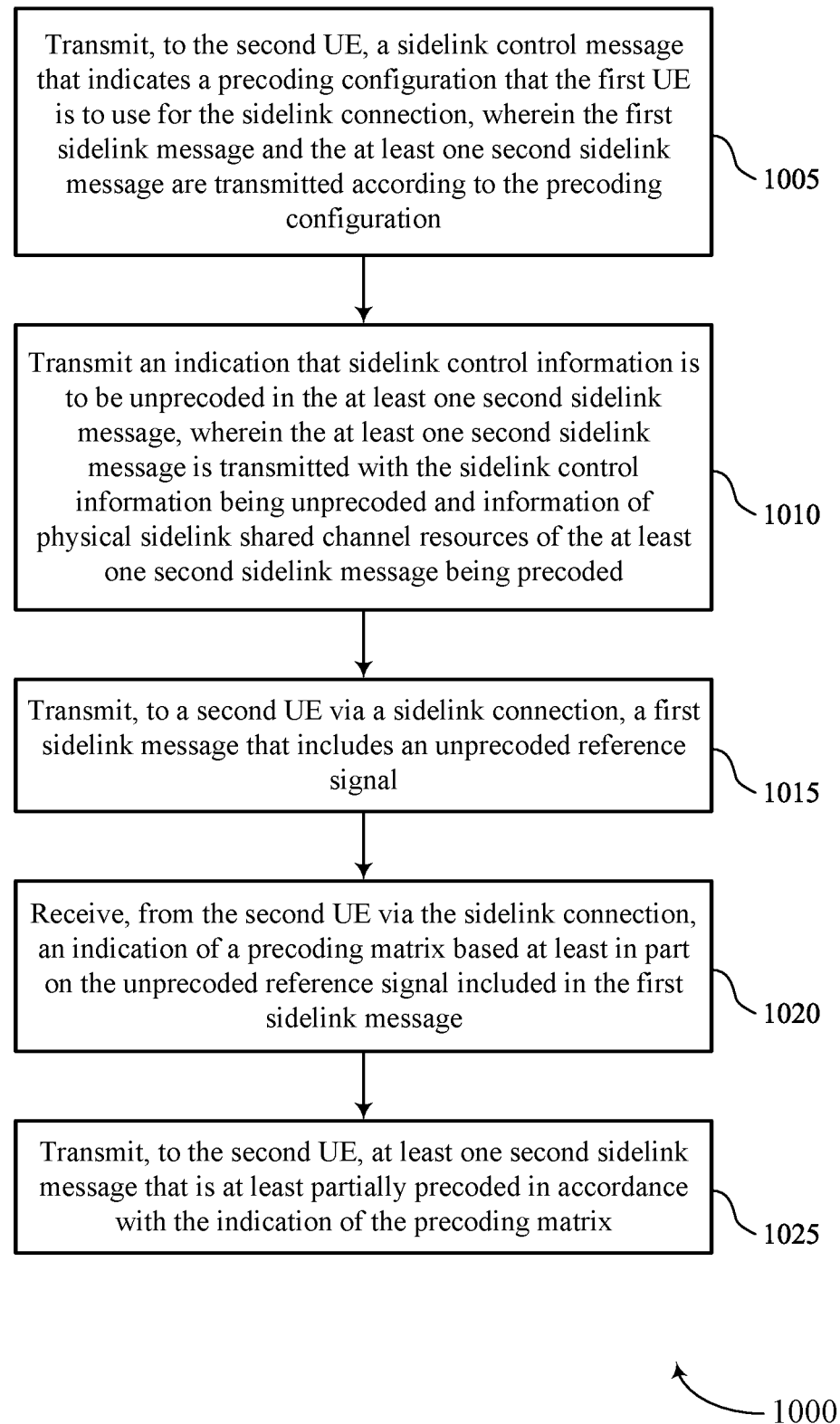

FIG. 10 shows a flowchart illustrating a method 1000 that supports precoding for sidelink communications in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include transmitting, to the second UE, a sidelink control message that indicates a precoding configuration that the first UE is to use for the sidelink connection, where the first sidelink message and the at least one second sidelink message are transmitted according to the precoding configuration. The operations of 1005 may be performed in accordance with examples as disclosed herein. In some examples, aspects of the operations of 1005 may be performed by a sidelink control component 740 as described with reference to FIG. 7.

At 1010, the method may include transmitting an indication that sidelink control information is to be unprecoded in the at least one second sidelink message, where the at least one second sidelink message is transmitted with the sidelink control information being unprecoded and information of physical sidelink shared channel resources of the at least one second sidelink message being precoded. The operations of 1010 may be performed in accordance with examples as disclosed herein. In some examples, aspects of the operations of 1010 may be performed by a sidelink control component 740 as described with reference to FIG. 7.

At 1015, the method may include transmitting, to a second UE via a sidelink connection, a first sidelink message that includes an unprecoded reference signal. The operations of 1015 may be performed in accordance with examples as disclosed herein. In some examples, aspects of the operations of 1015 may be performed by an unprecoded transmission component 725 as described with reference to FIG. 7.

At 1020, the method may include receiving, from the second UE via the sidelink connection, an indication of a precoding matrix based at least in part on the unprecoded reference signal included in the first sidelink message. The operations of 1020 may be performed in accordance with examples as disclosed herein. In some examples, aspects of the operations of 1020 may be performed by a PMI component 730 as described with reference to FIG. 7.

At 1025, the method may include transmitting, to the second UE, at least one second sidelink message that is at least partially precoded in accordance with the indication of the precoding matrix. The operations of 1025 may be performed in accordance with examples as disclosed herein. In some examples, aspects of the operations of 1025 may be performed by a precoded transmission component 735 as described with reference to FIG. 7.

Figure 11:
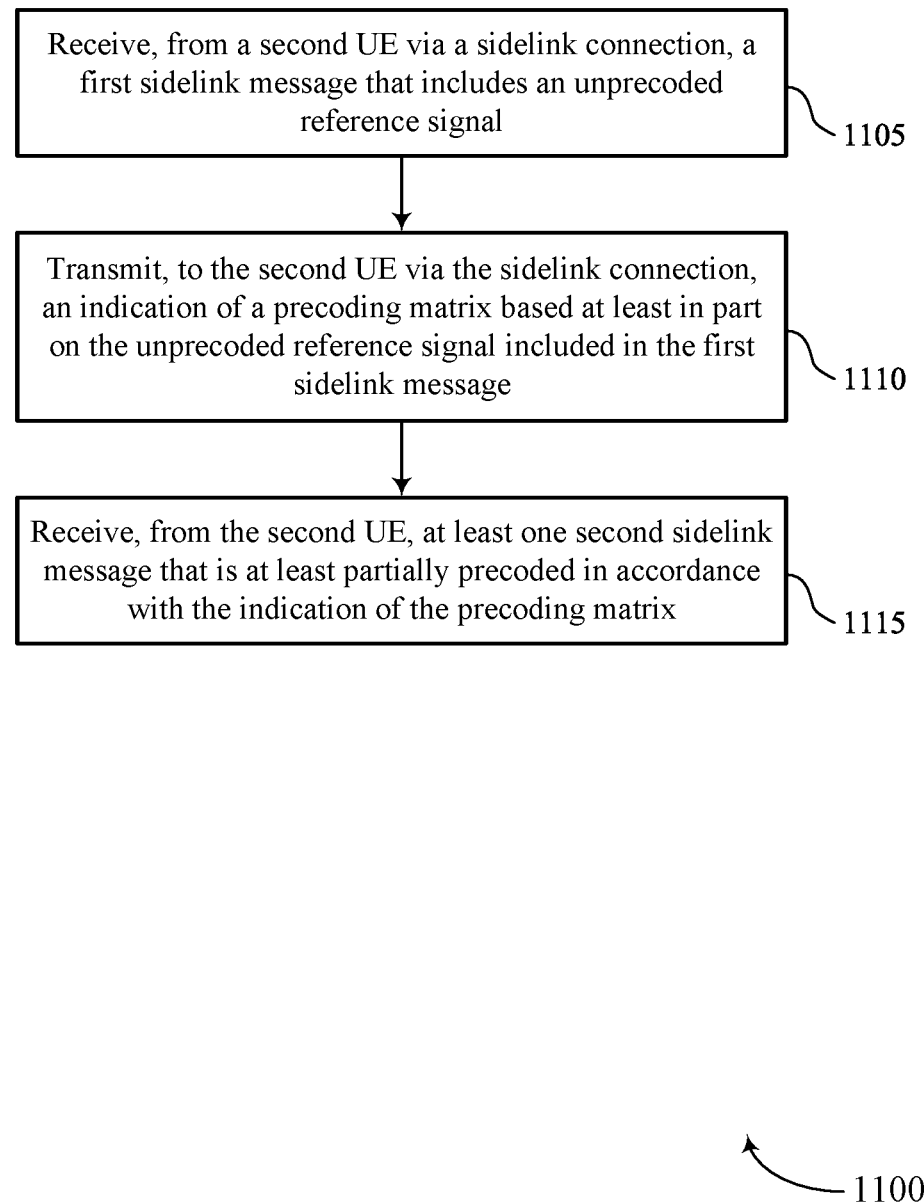

FIG. 11 shows a flowchart illustrating a method 1100 that supports precoding for sidelink communications in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, from a second UE via a sidelink connection, a first sidelink message that includes an unprecoded reference signal. The operations of 1105 may be performed in accordance with examples as disclosed herein. In some examples, aspects of the operations of 1105 may be performed by an unprecoded transmission component 725 as described with reference to FIG. 7.

At 1110, the method may include transmitting, to the second UE via the sidelink connection, an indication of a precoding matrix based at least in part on the unprecoded reference signal included in the first sidelink message. The operations of 1110 may be performed in accordance with examples as disclosed herein. In some examples, aspects of the operations of 1110 may be performed by a PMI component 730 as described with reference to FIG. 7.

At 1115, the method may include receiving, from the second UE, at least one second sidelink message that is at least partially precoded in accordance with the indication of the precoding matrix. The operations of 1115 may be performed in accordance with examples as disclosed herein. In some examples, aspects of the operations of 1115 may be performed by a precoded transmission component 735 as described with reference to FIG. 7.

The following provides an overview of aspects of the present disclosure:

Aspect 1: A method for wireless communications at a first UE, comprising: transmitting, to a second UE via a sidelink connection, a first sidelink message that includes an unprecoded reference signal; receiving, from the second UE via the sidelink connection, an indication of a precoding matrix based at least in part on the unprecoded reference signal included in the first sidelink message; and transmitting, to the second UE, at least one second sidelink message that is at least partially precoded in accordance with the indication of the precoding matrix.

Aspect 2: The method of aspect 1, further comprising: transmitting, to the second UE, a sidelink control message that indicates a precoding configuration that the first UE is to use for the sidelink connection, wherein the first sidelink message and the at least one second sidelink message are transmitted according to the precoding configuration.

Aspect 3: The method of aspect 2, wherein transmitting the sidelink control message comprises: transmitting an indication of a periodicity that corresponds to the precoding configuration, wherein the first sidelink message and the at least one second sidelink message are transmitted according to the periodicity and subsequent first sidelink messages include the unprecoded reference signal used for precoding matrix determination to be applied to precoding for subsequent second sidelink messages.

Aspect 4: The method of aspect 3, wherein the precoding configuration further indicates an expiration time; and the first UE is to transmit an unprecoded sidelink message upon satisfaction of the expiration time.

Aspect 5: The method of aspect 4, wherein the precoding configuration indicates the expiration time based at least in part on the first UE and the second UE operating according to a sidelink mode 2 procedure.

Aspect 6: The method of any of aspects 2 through 5, wherein transmitting the sidelink control message comprises: transmitting an indication of a bitmap that corresponds to a precoding pattern across a set of transmission time intervals to be used for the sidelink connection, where a first value of the bitmap corresponds to a sidelink message that includes the unprecoded reference signal and a second value of the bitmap corresponds to a sidelink message that is at least partially precoded, wherein the first sidelink message and the at least one second sidelink message are transmitted in accordance with the bitmap.

Aspect 7: The method of any of aspects 2 through 6, wherein transmitting the sidelink control message comprises: transmitting an indication that sidelink control information is to be unprecoded in the at least one second sidelink message, wherein the at least one second sidelink message is transmitted with the sidelink control information being unprecoded and information of physical sidelink shared channel resources of the at least one second sidelink message being precoded.

Aspect 8: The method of aspect 7, wherein the sidelink control information that is to be unprecoded is type 1 sidelink control information.

Aspect 9: The method of any of aspects 7 through 8, wherein the precoding configuration indicates that the sidelink control information is to be unprecoded based at least in part on the sidelink control information includes a resource reservation for one or more subsequent transmissions.

Aspect 10: The method of any of aspects 7 through 9, wherein the precoding configuration indicates that the sidelink control information is to be unprecoded based at least in part on the first UE operating according to a mode 1 sidelink procedure.

Aspect 11: The method of any of aspects 2 through 10, wherein transmitting the sidelink control message comprises: transmitting an indication that sidelink control information is to be precoded in the at least one second sidelink message, wherein the at least one second sidelink message is transmitted with the sidelink control information being precoded and information of physical sidelink shared channel resources of the at least one second sidelink message being precoded.

Aspect 12: The method of aspect 11, wherein the sidelink control information that is to be precoded is type 1 sidelink control information.

Aspect 13: The method of any of aspects 2 through 12, wherein transmitting the sidelink control message comprises: transmitting an indication that the second UE is to report the indication of the precoding matrix, that the at least one second sidelink message is to be at least partially precoded, or both.

Aspect 14: The method of any of aspects 2 through 13, wherein transmitting the sidelink control message comprises: transmitting a type 1 sidelink control information message, a type 2 sidelink control information message, or a PC5 message.

Aspect 15: The method of any of aspects 2 through 14, wherein transmitting the sidelink control message comprises: transmitting the sidelink control message that indicates the precoding configuration when a number of ports to be used for sidelink transmissions on the sidelink connection is two or more.

Aspect 16: The method of any of aspects 1 through 15, further comprising: transmitting a sidelink control message that activates a precoding configuration that the first UE and the second UE are to apply to the sidelink connection, wherein the first sidelink message and the at least one second sidelink message are transmitted according to the activated precoding configuration.

Aspect 17: The method of any of aspects 1 through 16, wherein receiving the indication of a precoding matrix comprises: receiving the indication of the precoding matrix on a resource of a physical sidelink feedback channel.

Aspect 18: The method of aspect 17, wherein the physical sidelink feedback channel includes a first resource block that includes the indication of the precoding matrix and a second resource block including HARQ feedback data.

Aspect 19: The method of any of aspects 1 through 18, further comprising: transmitting, to the second UE, a sidelink control message including an indication of a subset of precoding matrices of a plurality of precoding matrices that the second UE is to select from based on the unprecoded reference signal, wherein the indicated precoding matrix is selected from the subset of precoding matrices.

Aspect 20: The method of aspect 19, further comprising: receiving, from a base station, a downlink control message including an indication of the subset of precoding matrices, wherein the first UE transmits the indication of the subset of precoding matrices based at least in part on receiving the indication of the subset of precoding matrices from the base station.

Aspect 21: The method of aspect 20, wherein the downlink control message is a radio resource control message, a medium access control layer control element message, or a downlink control information message.

Aspect 22: The method of any of aspects 1 through 21, wherein transmitting the first sidelink message comprises: transmitting the unprecoded reference signal that is a sidelink demodulation reference signal or a sidelink channel state information reference signal.

Aspect 23: The method of any of aspects 1 through 22, further comprising: receiving, from a base station, a downlink control message that indicates a sidelink configured grant configuration, wherein the first sidelink message and the at least one second sidelink message are transmitted according to the sidelink configured grant configuration.

Aspect 24: A method for wireless communications at a first UE, comprising: receiving, from a second UE via a sidelink connection, a first sidelink message that includes an unprecoded reference signal; transmitting, to the second UE via the sidelink connection, an indication of a precoding matrix based at least in part on the unprecoded reference signal included in the first sidelink message; and receiving, from the second UE, at least one second sidelink message that is at least partially precoded in accordance with the indication of the precoding matrix.

Aspect 25: The method of aspect 24, further comprising: receiving, from the second UE, a sidelink control message that indicates a precoding configuration that the first UE is to use for the sidelink connection, wherein the first sidelink message and the at least one second sidelink message are received according to the precoding configuration.

Aspect 26: The method of aspect 25, wherein receiving the sidelink control message comprises: receiving an indication of a periodicity that corresponds to the precoding configuration, wherein the first sidelink message and the at least one second sidelink message are received according to the periodicity and subsequent first sidelink messages include the unprecoded reference signal used for precoding matrix determination to be applied to precoding for subsequent at least one second sidelink messages.

Aspect 27: The method of aspect 26, wherein the precoding configuration further indicates an expiration time, the first UE is to transmit an unprecoded sidelink message upon satisfaction of the expiration time.

Aspect 28: The method of any of aspects 25 through 27, wherein receiving the sidelink control message comprises: receiving an indication of a bitmap that corresponds to a precoding pattern across a set of transmission time intervals to be used for the sidelink connection, where a first value of the bitmap corresponds to a sidelink message that includes the unprecoded reference signal and a second value of the bitmap corresponds to a sidelink message that is at least partially precoded, wherein the first sidelink message and the at least one second sidelink message are received in accordance with the bitmap.

Aspect 29: The method of any of aspects 25 through 28, wherein receiving the sidelink control message comprises: receiving an indication that sidelink control information is to be unprecoded in the at least one second sidelink message, wherein the at least one second sidelink message is transmitted with the sidelink control information being unprecoded and information of physical sidelink shared channel resources of the at least one second sidelink message being precoded.

Aspect 30: The method of aspect 29, wherein the sidelink control information that is to be unprecoded is type 1 sidelink control information.

Aspect 31: The method of any of aspects 29 through 30, wherein the precoding configuration indicates that the sidelink control information is to be unprecoded based at least in part on the sidelink control information including a resource reservation for one or more subsequent transmissions.

Aspect 32: The method of any of aspects 25 through 31, wherein receiving the sidelink control message comprises: receiving an indication that sidelink control information is to be precoded in the at least one second sidelink message, wherein the at least one second sidelink message is transmitted with the sidelink control information being precoded and information of physical sidelink shared channel resources of the at least one second sidelink message being precoded.

Aspect 33: The method of aspect 32, wherein the sidelink control information that is to be precoded is type 1 sidelink control information.

Aspect 34: The method of any of aspects 25 through 33, wherein receiving the sidelink control message comprises: receiving an indication that the second UE is to report the indication of the precoding matrix, that the at least one second sidelink message is to be at least partially precoded, or both.

Aspect 35: The method of any of aspects 25 through 34, wherein receiving the sidelink control message comprises: receiving a type 1 sidelink control information message, a type 2 sidelink control information message, or a PC5 message.

Aspect 36: The method of any of aspects 25 through 35, wherein transmitting the indication of the precoding matrix comprises: transmitting the indication of the precoding matrix on a resource of a physical sidelink feedback channel.

Aspect 37: The method of aspect 36, wherein the physical sidelink feedback channel includes a first resource block that includes the indication of the precoding matrix and a second resource block including HARQ feedback data.

Aspect 38: The method of any of aspects 25 through 37, further comprising: receiving, form the second UE, a sidelink control message including an indication of a subset of precoding matrices of a plurality of precoding matrices that the first UE is to select from based on the unprecoded reference signal, wherein the indicated precoding matrix is selected from the subset of precoding matrices.

Aspect 39: The method of any of aspects 24 through 38, wherein receiving the first sidelink message comprises: receiving the unprecoded reference signal that is a sidelink demodulation reference signal or a sidelink channel state information reference signal.

Aspect 40: The method of any of aspects 24 through 39, further comprising: measuring the unprecoded reference signal of the first sidelink message; and selecting the precoding matrix based at least in part on measuring the unprecoded reference signal.

Aspect 41: An apparatus for wireless communications at a first UE, comprising a processor; memory coupled with the processor; and instructions stored in the memory and executable by the processor to cause the apparatus to perform a method of any of aspects 1 through 23.

Aspect 42: An apparatus for wireless communications at a first UE, comprising at least one means for performing a method of any of aspects 1 through 23.

Aspect 43: A non-transitory computer-readable medium storing code for wireless communications at a first UE, the code comprising instructions executable by a processor to perform a method of any of aspects 1 through 23.

Aspect 44: An apparatus for wireless communications at a first UE, comprising at least one processor; memory coupled with the at least one processor; and instructions stored in the memory and executable by the at least one processor to cause the apparatus to perform a method of any of aspects 24 through 40.

Aspect 45: An apparatus for wireless communications at a first UE, comprising at least one means for performing a method of any of aspects 24 through 40.

Aspect 46: A non-transitory computer-readable medium storing code for wireless communications at a first UE, the code comprising instructions executable by at least one processor to perform a method of any of aspects 24 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    transmitting, to a second UE, a sidelink control message that includes precoding information indicative of a precoding configuration that the first UE is to use for a sidelink connection, wherein the precoding information is indicative of a bitmap that corresponds to a precoding pattern across a set of transmission time intervals to be used for transmission of a set of sidelink messages via the sidelink connection, wherein a first value of the bitmap corresponds to a sidelink message that includes an unprecoded reference signal and a second value of the bitmap corresponds to a sidelink message that is at least partially precoded;

transmitting, to the second UE via the sidelink connection, a first sidelink message of the set of sidelink messages, wherein the first sidelink message includes the unprecoded reference signal in accordance with the bitmap;

receiving, from the second UE via the sidelink connection, an indication of a precoding matrix based at least in part on the unprecoded reference signal included in the first sidelink message; and transmitting, to the second UE, at least one second sidelink message of the set of sidelink messages, wherein the at least one second sidelink message is at least partially precoded in accordance with the indication of the precoding matrix and the bitmap.

2. The method of claim 1, wherein transmitting the sidelink control message comprises:

transmitting an indication that sidelink control information is to be unprecoded in the at least one second sidelink message, wherein the at least one second sidelink message is transmitted with the sidelink control information being unprecoded and information of physical sidelink shared channel resources of the at least one second sidelink message being precoded.

3. The method of claim 2, wherein the sidelink control information that is to be unprecoded is type 1 sidelink control information.

4. The method of claim 2, wherein the precoding configuration indicates that the sidelink control information is to be unprecoded based at least in part on the sidelink control information includes a resource reservation for one or more subsequent transmissions.

5. The method of claim 2, wherein the precoding configuration indicates that the sidelink control information is to be unprecoded based at least in part on the first UE operating according to a mode 1 sidelink procedure.

6. The method of claim 1, wherein transmitting the sidelink control message comprises:

transmitting an indication that sidelink control information is to be precoded in the at least one second sidelink message, wherein the at least one second sidelink message is transmitted with the sidelink control information being precoded and information of physical sidelink shared channel resources of the at least one second sidelink message being precoded.

7. The method of claim 6, wherein the sidelink control information that is to be precoded is type 1 sidelink control information.

8. The method of claim 1, wherein transmitting the sidelink control message comprises:

transmitting an indication that the second UE is to report the indication of the precoding matrix, that the at least one second sidelink message is to be at least partially precoded, or both.

9. The method of claim 1, wherein transmitting the sidelink control message comprises:

transmitting a type 1 sidelink control information message, a type 2 sidelink control information message, or a PC5 message.

10. The method of claim 1, wherein transmitting the sidelink control message comprises:

transmitting the sidelink control message that indicates the precoding configuration when a number of ports to be used for sidelink transmissions on the sidelink connection is two or more.

11. The method of claim 1, wherein transmitting the sidelink control message comprises:

transmitting the sidelink control message that activates the precoding configuration that the first UE and the second UE are to apply to the sidelink connection, wherein the first sidelink message and the at least one second sidelink message are transmitted according to the activated precoding configuration.

12. The method of claim 1, wherein receiving the indication of the precoding matrix comprises:

receiving the indication of the precoding matrix on a resource of a physical sidelink feedback channel.

13. The method of claim 12, wherein the physical sidelink feedback channel includes a first resource block that includes the indication of the precoding matrix and a second resource block including hybrid automatic repeat request (HARQ) feedback data.

14. The method of claim 1, wherein transmitting the sidelink control message comprises:

transmitting, to the second UE, the sidelink control message including an indication of a subset of precoding matrices of a plurality of precoding matrices that the second UE is to select from based on the unprecoded reference signal, wherein the indicated precoding matrix is selected from the subset of precoding matrices.

15. The method of claim 14, further comprising:

receiving, from a base station, a downlink control message including an indication of the subset of precoding matrices, wherein the first UE transmits the indication of the subset of precoding matrices based at least in part on receiving the indication of the subset of precoding matrices from the base station.

16. The method of claim 15, wherein the downlink control message is a radio resource control message, a medium access control layer control element message, or a downlink control information message.

17. The method of claim 1, wherein transmitting the first sidelink message comprises:

transmitting the unprecoded reference signal that is a sidelink demodulation reference signal or a sidelink channel state information reference signal.

18. The method of claim 1, further comprising:

receiving, from a base station, a downlink control message that indicates a sidelink configured grant configuration, wherein the first sidelink message and the at least one second sidelink message are transmitted according to the sidelink configured grant configuration.

19. A method for wireless communications at a first user equipment (UE), comprising:

receiving, from a second UE, a sidelink control message that includes precoding information indicative of a precoding configuration that the first UE is to use for a sidelink connection, wherein the precoding information is indicative of a bitmap that corresponds to a precoding pattern across a set of transmission time intervals to be used for transmission of a set of sidelink messages via the sidelink connection, wherein a first value of the bitmap corresponds to a sidelink message that includes an unprecoded reference signal and a second value of the bitmap corresponds to a sidelink message that is at least partially precoded;

receiving, from the second UE via the sidelink connection, a first sidelink message of the set of sidelink messages, wherein the first sidelink message includes the unprecoded reference signal in accordance with the bitmap;

transmitting, to the second UE via the sidelink connection, an indication of a precoding matrix based at least in part on the unprecoded reference signal included in the first sidelink message; and receiving, from the second UE, at least one second sidelink message of the set of sidelink messages, wherein the at least one second sidelink message is at least partially precoded in accordance with the indication of the precoding matrix and the bitmap.

20. An apparatus for wireless communications at a first user equipment (UE), comprising:

at least one processor;

memory coupled with the at least one processor; and instructions stored in the memory and executable by the at least one processor to cause the apparatus to:

transmit, to a second UE, a sidelink control message that includes precoding information indicative of a precoding configuration that the first UE is to use for a sidelink connection, wherein the precoding information is indicative of a bitmap that corresponds to a precoding pattern across a set of transmission time intervals to be used for transmission of a set of sidelink messages via the sidelink connection, wherein a first value of the bitmap corresponds to a sidelink message that includes an unprecoded reference signal and a second value of the bitmap corresponds to a sidelink message that is at least partially precoded;

transmit, to the second UE via the sidelink connection, a first sidelink message of the set of sidelink messages, wherein the first sidelink message includes the unprecoded reference signal in accordance with the bitmap;

receive, from the second UE via the sidelink connection, an indication of a precoding matrix based at least in part on the unprecoded reference signal included in the first sidelink message; and transmit, to the second UE, at least one second sidelink message of the set of sidelink messages, wherein the at least one second sidelink message is at least partially precoded in accordance with the indication of the precoding matrix and the bitmap.

21. An apparatus for wireless communications at a first user equipment (UE), comprising:

at least one processor;

memory coupled with the at least one processor; and instructions stored in the memory and executable by the at least one processor to cause the apparatus to:

receive, from a second UE, a sidelink control message that includes precoding information indicative of a precoding configuration that the first UE is to use for a sidelink connection, wherein the precoding information is indicative of a bitmap that corresponds to a precoding pattern across a set of transmission time intervals to be used for transmission of a set of sidelink messages via the sidelink connection, wherein a first value of the bitmap corresponds to a sidelink message that includes an unprecoded reference signal and a second value of the bitmap corresponds to a sidelink message that is at least partially precoded;

receive, from the second UE via the sidelink connection, a first sidelink message of the set of sidelink messages, wherein the first sidelink message includes the unprecoded reference signal in accordance with the bitmap;

transmit, to the second UE via the sidelink connection, an indication of a precoding matrix based at least in part on the unprecoded reference signal included in the first sidelink message; and receive, from the second UE, at least one second sidelink message of the set of sidelink messages, wherein the at least one second sidelink message is at least partially precoded in accordance with the indication of the precoding matrix and the bitmap.

* * * * *